(12) United States Patent
Lacey

(10) Patent No.: US 6,708,469 B2
(45) Date of Patent: *Mar. 23, 2004

(54) WRAPPING MACHINE

(75) Inventor: Liam J. Lacey, Dublin (IE)

(73) Assignee: Comtor Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 10/295,986

(22) Filed: Nov. 18, 2002

(65) Prior Publication Data

US 2003/0070392 A1 Apr. 17, 2003

Related U.S. Application Data

(62) Division of application No. 09/994,854, filed on Nov. 28, 2001, now Pat. No. 6,499,276, which is a division of application No. 09/463,361, filed as application No. PCT/IE98/00066 on Jul. 24, 1998, now Pat. No. 6,341,470.

(30) Foreign Application Priority Data

Jul. 25, 1997 (IE) ............................................. S970545
Jan. 16, 1998 (IE) ............................................. S980029

(51) Int. Cl.$^7$ ............................................. B65B 11/00
(52) U.S. Cl. ............................. 53/582; 53/176; 53/210; 53/399; 53/556; 53/587
(58) Field of Search ........................... 53/176, 210, 211, 53/214, 215, 399, 556, 587, 588, 591, 449, 441; 414/21, 24.5, 492, 497, 501, 728, 743, 778, 786

(56) References Cited

U.S. PATENT DOCUMENTS

| | | | |
|---|---|---|---|
| 4,524,685 A | | 6/1985 | Bergmann |
| 4,546,593 A | | 10/1985 | Lasscock |
| 4,593,517 A | | 6/1986 | Mattila |
| 4,607,476 A | | 8/1986 | Fulton |
| 4,641,484 A | * | 2/1987 | Popelka ........................ 53/399 |
| 4,730,436 A | * | 3/1988 | Angelino ...................... 53/170 |
| 4,841,851 A | | 6/1989 | Quataert |
| 4,942,719 A | | 7/1990 | Fleissner |
| 5,125,210 A | | 6/1992 | Lang et al. |
| 5,660,023 A | * | 8/1997 | Kivela ........................ 53/399 |
| 5,661,956 A | | 9/1997 | Tardif |
| 5,664,933 A | * | 9/1997 | Scherer et al. ............... 414/743 |
| 5,689,934 A | * | 11/1997 | Scherer et al. ................. 53/399 |

(List continued on next page.)

FOREIGN PATENT DOCUMENTS

| | | |
|---|---|---|
| DE | 38 05 224 | 8/1989 |
| DE | 40 37 533 | 5/1992 |
| EP | 0 110 110 | 6/1984 |
| WO | 96 08957 | 3/1996 |
| WO | 97 18699 | 5/1997 |
| WO | 97 23125 | 7/1997 |

Primary Examiner—Rinaldi Rada
Assistant Examiner—Hemant M. Desai
(74) Attorney, Agent, or Firm—Young & Thompson

(57) ABSTRACT

A wrapping machine includes a first wrapping station for applying a strip of wrapping around a bale to partially wrap the bale in wrapping material, a second wrapping station for applying a strip of wrapping material around the bale to completely wrap the bale in wrapping material, and a transfer device for transferring the partially wrapped bale from the first wrapping station to the second wrapping station. This transfer device is swingable through approximately 90° from the first wrapping station to the second wrapping station. The first wrapping station includes a dispenser for dispensing a strip of plastic film and a device for rotating the dispenser about a substantially vertical axis around the bale. The second wrapping station includes a device for rotating the bale about a substantially horizontal axis and a dispenser for dispensing wrapping material around the bale as it is turned on the horizontal axis. A compaction station is provided to compact loose material into the bale before wrapping.

7 Claims, 32 Drawing Sheets

U.S. PATENT DOCUMENTS

| | | | |
|---|---|---|---|
| 5,740,662 A | * | 4/1998 | Royneberg et al. ............ 53/556 |
| 5,802,805 A | | 9/1998 | .O slashed.iestad |
| 6,082,076 A | * | 7/2000 | Anderson et al. ............. 53/176 |
| 6,341,470 B1 | * | 1/2002 | Lacey ........................ 53/176 |
| 6,499,276 B2 | * | 12/2002 | Lacey ........................ 53/438 |

* cited by examiner

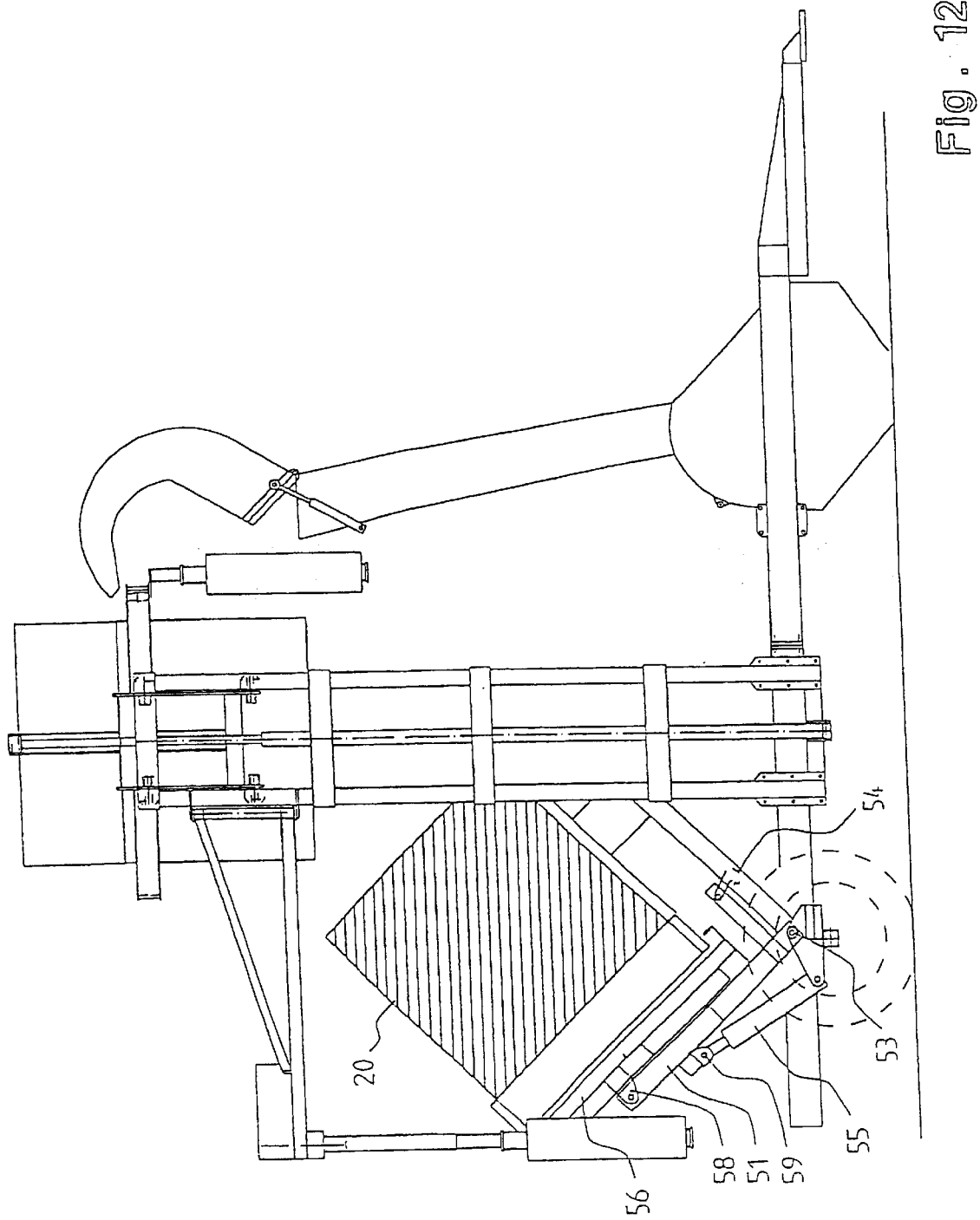

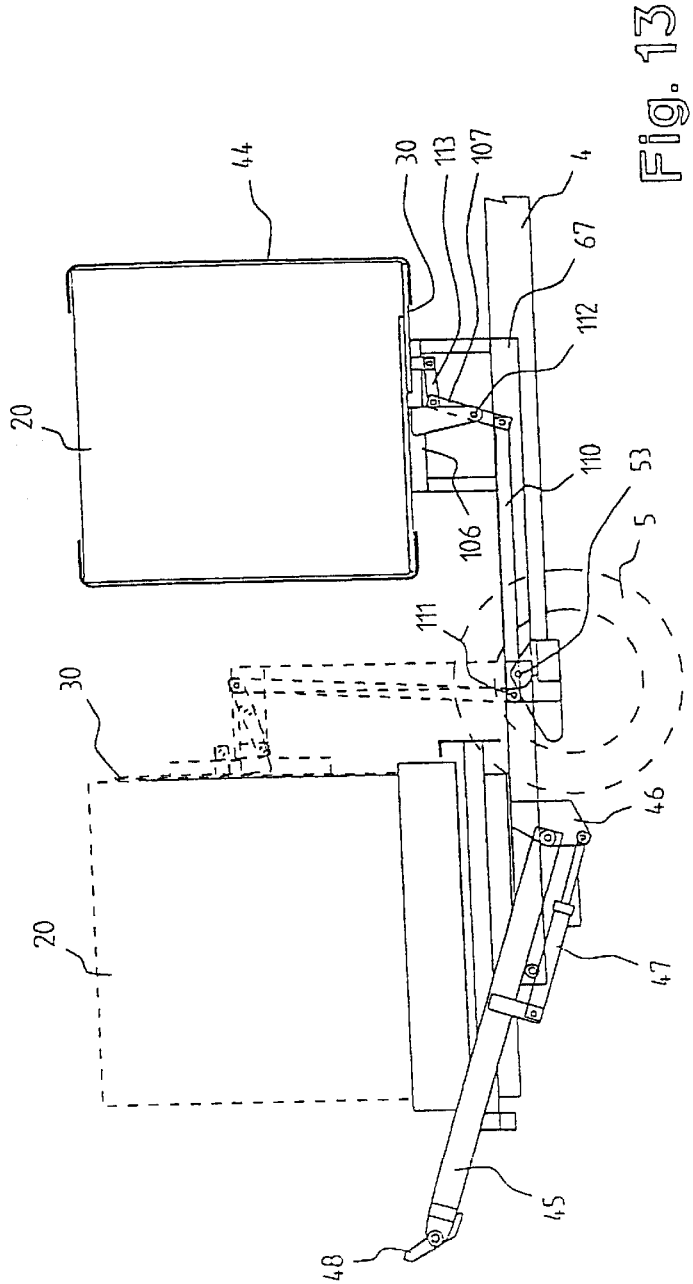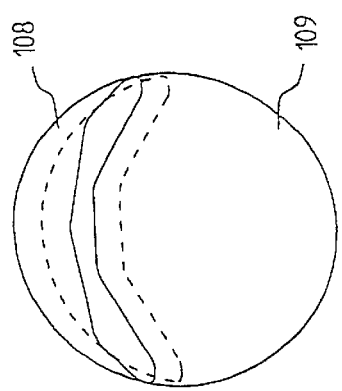

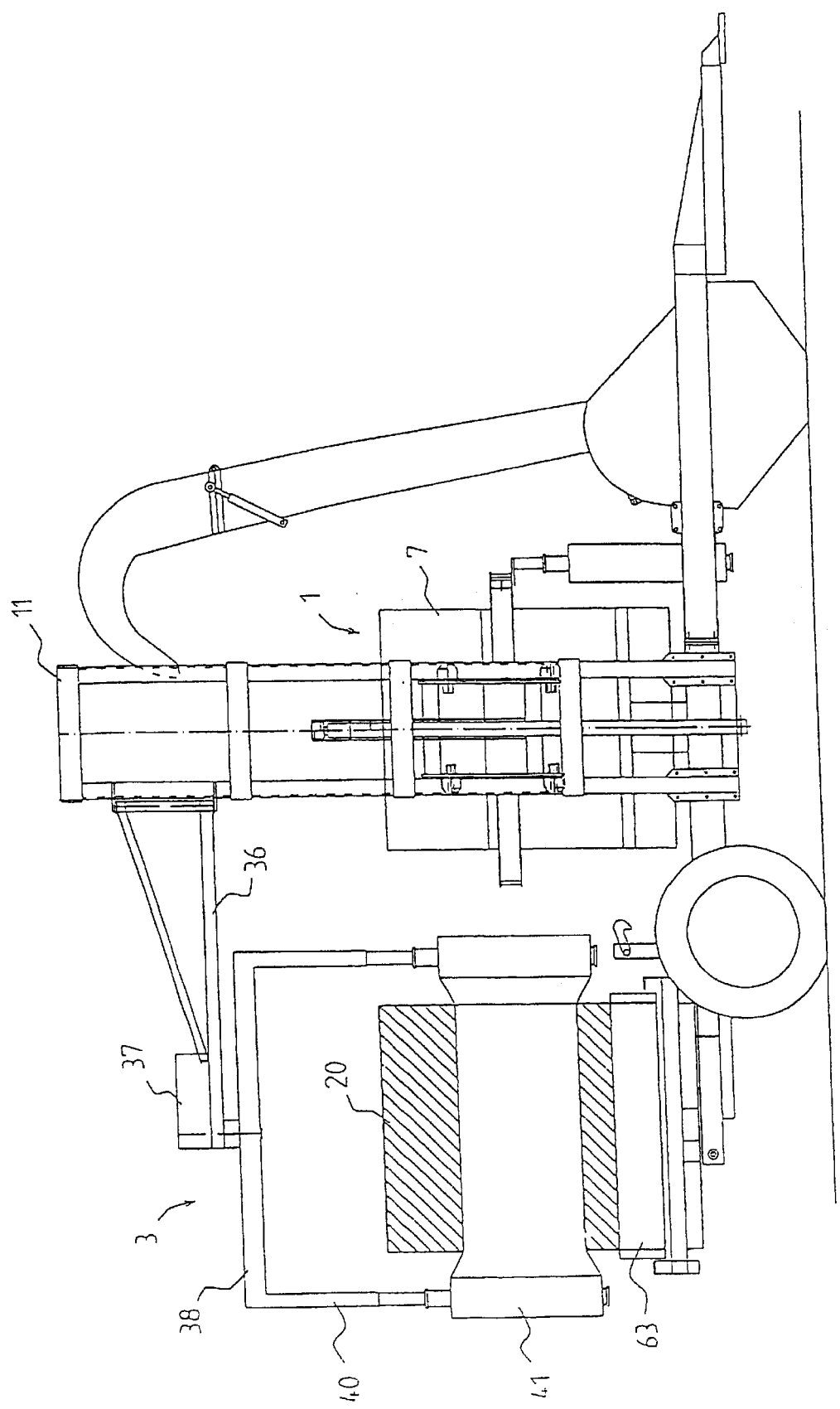

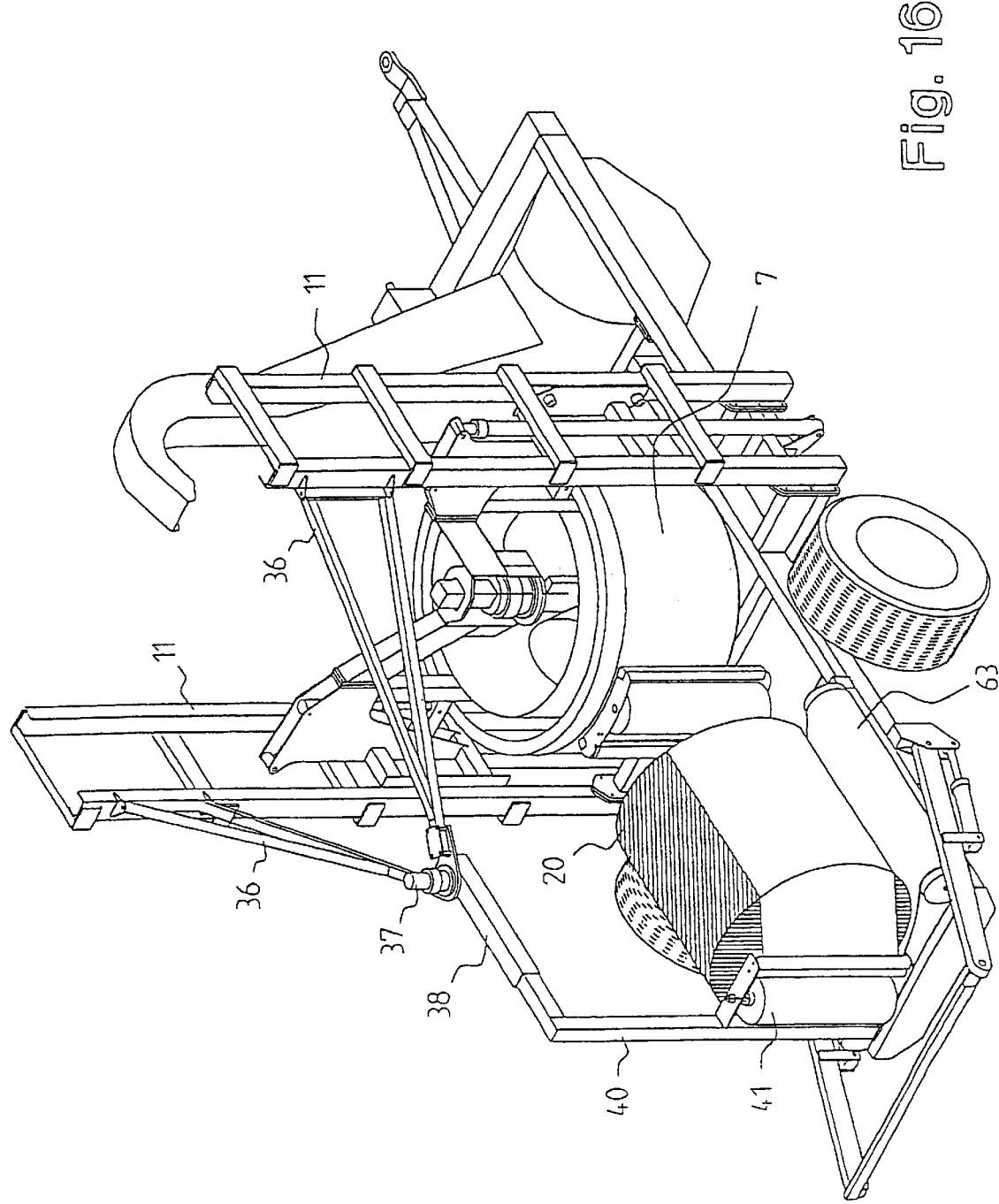

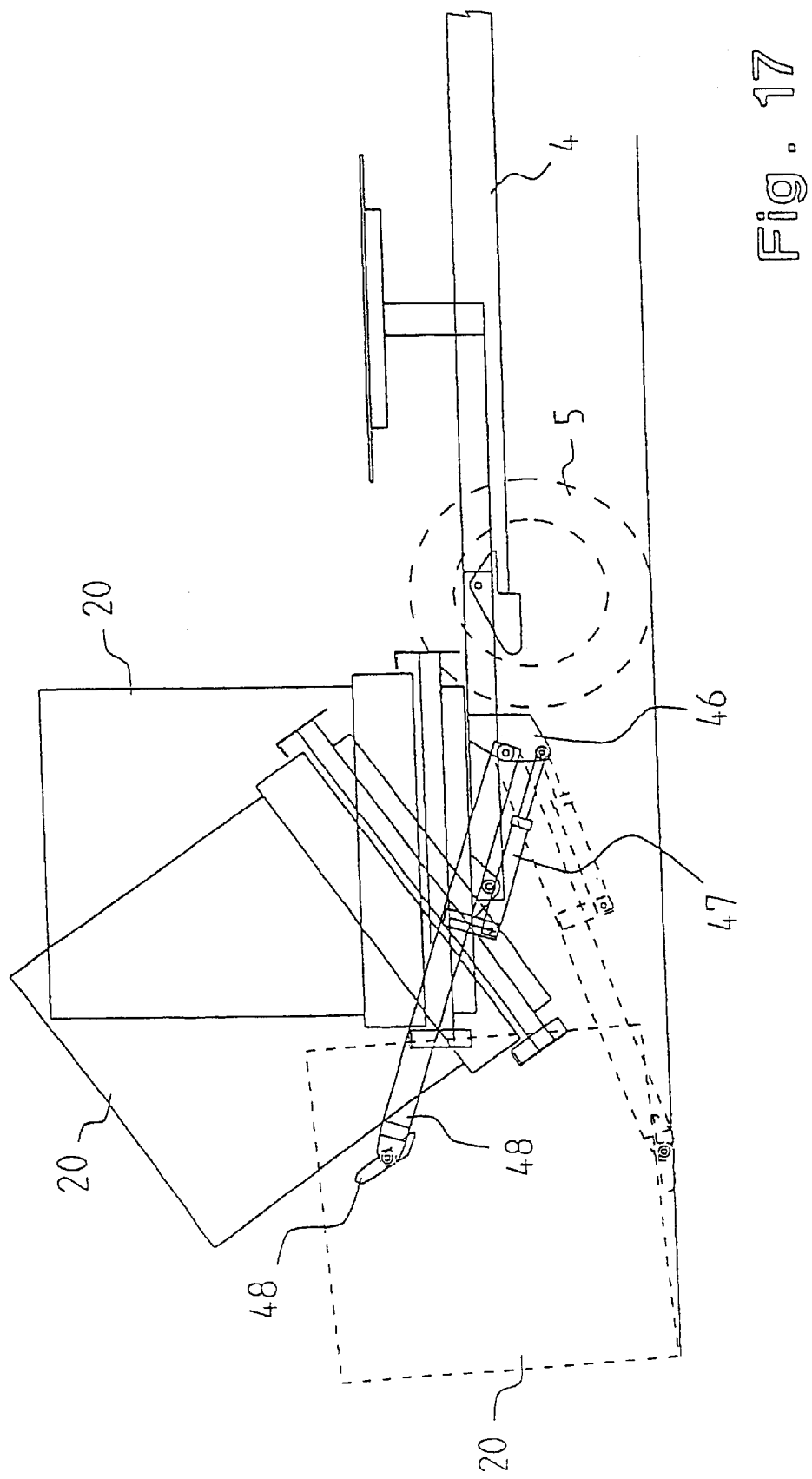

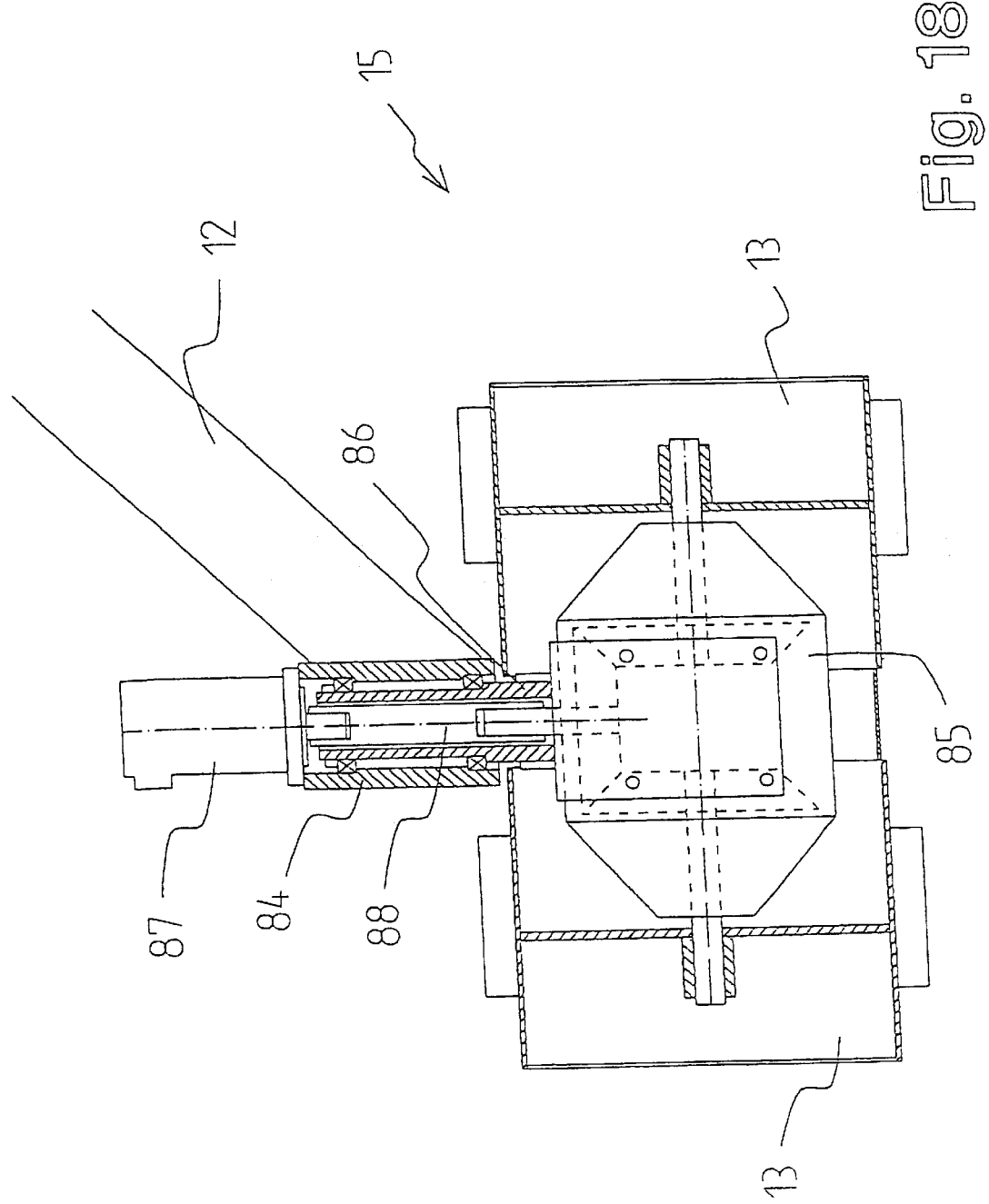

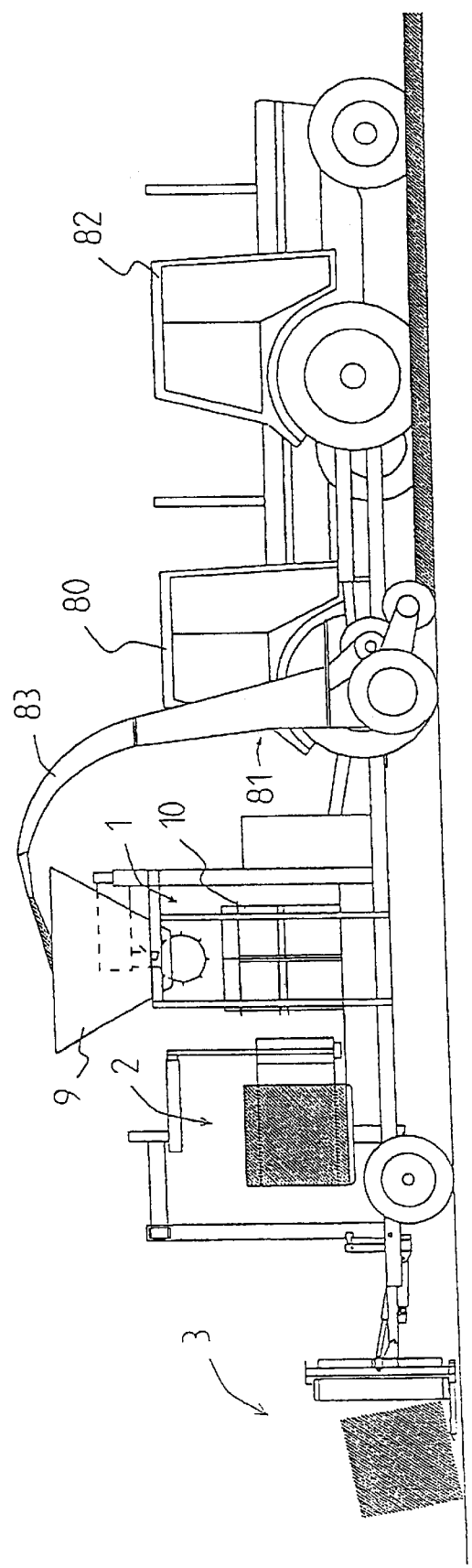

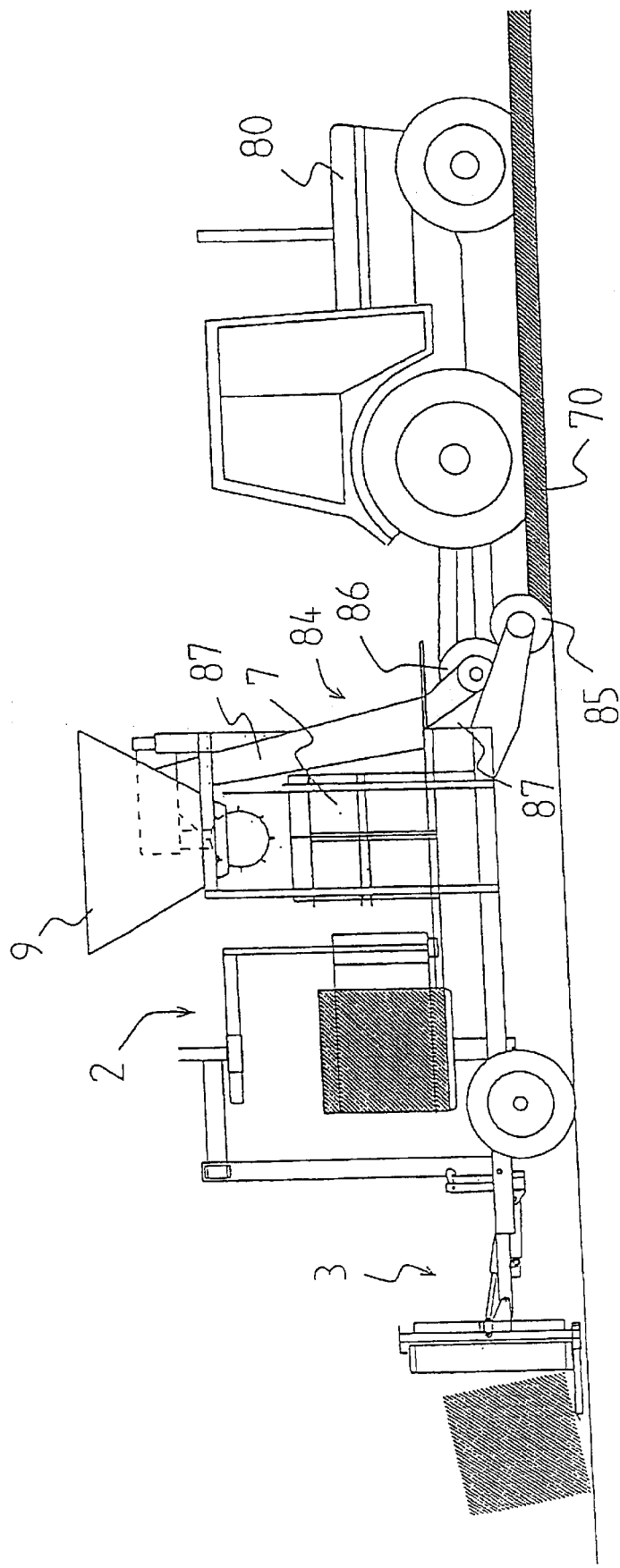

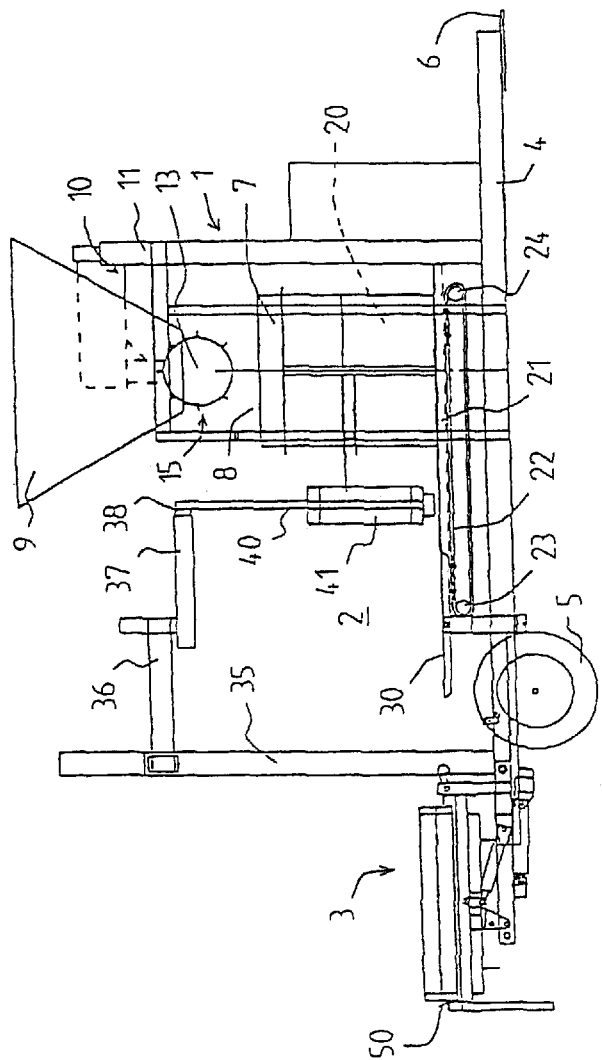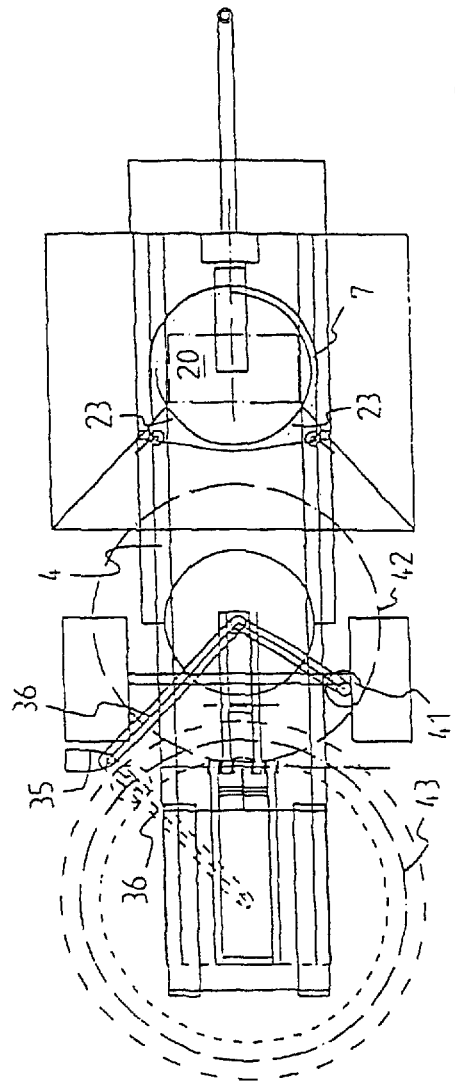

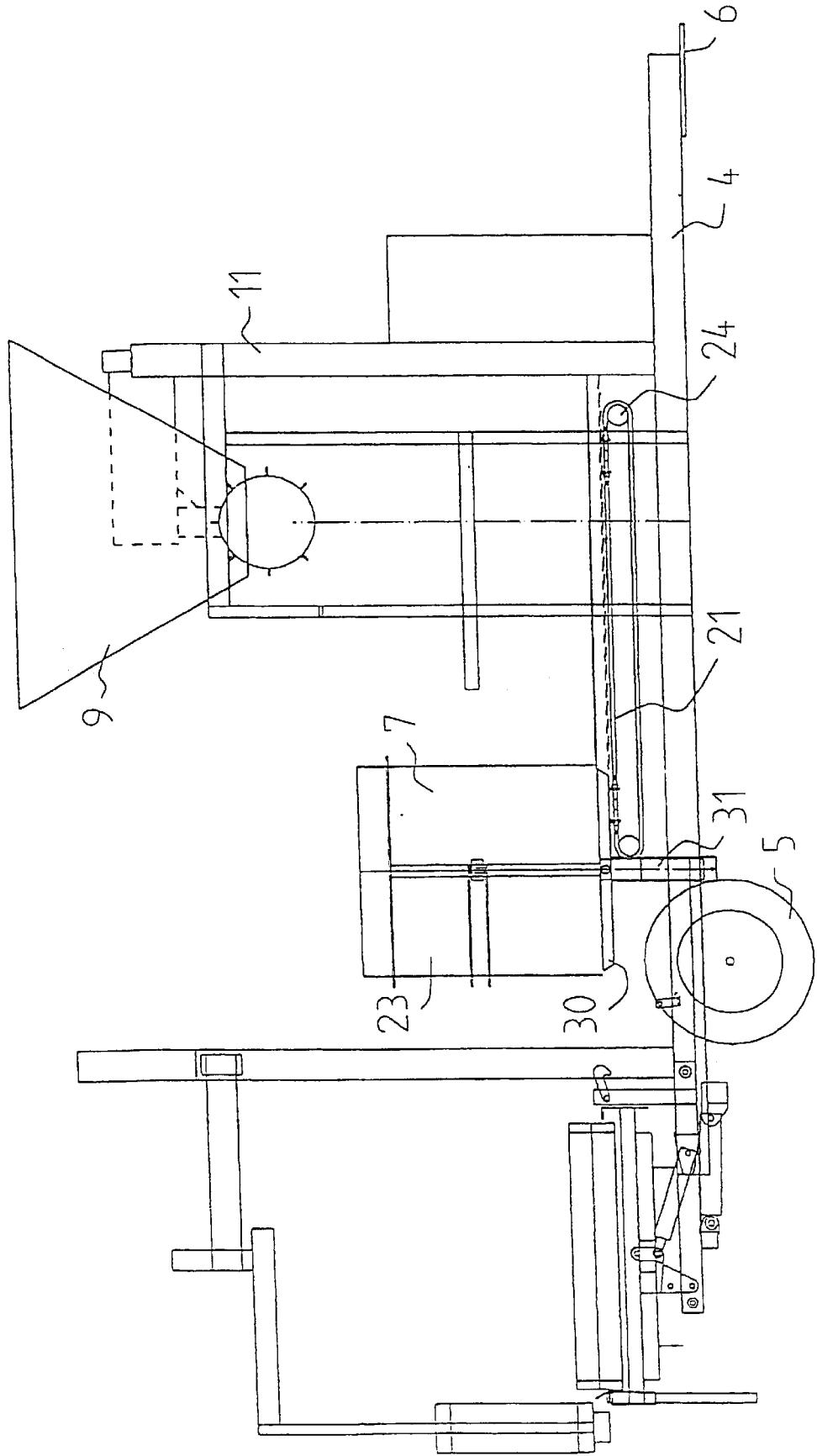

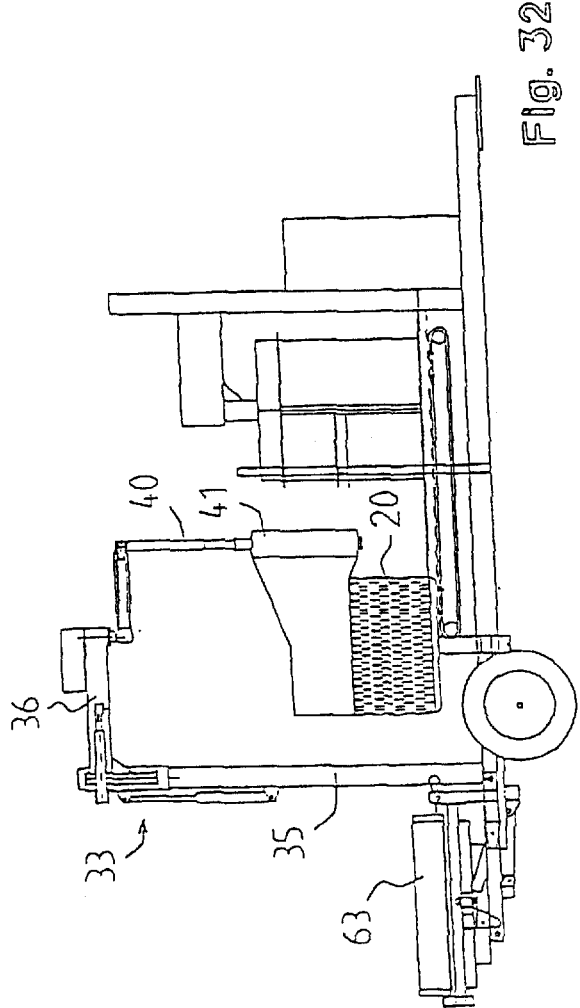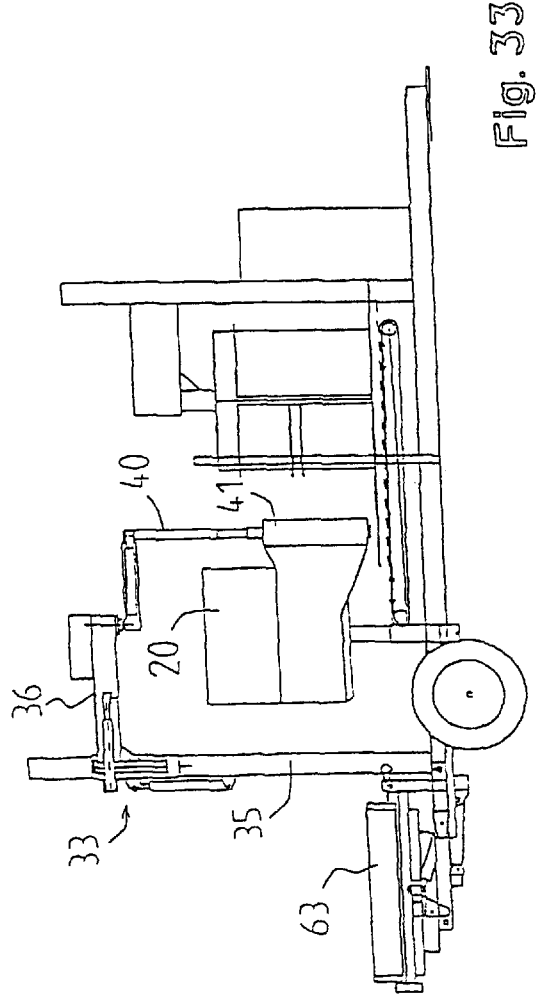

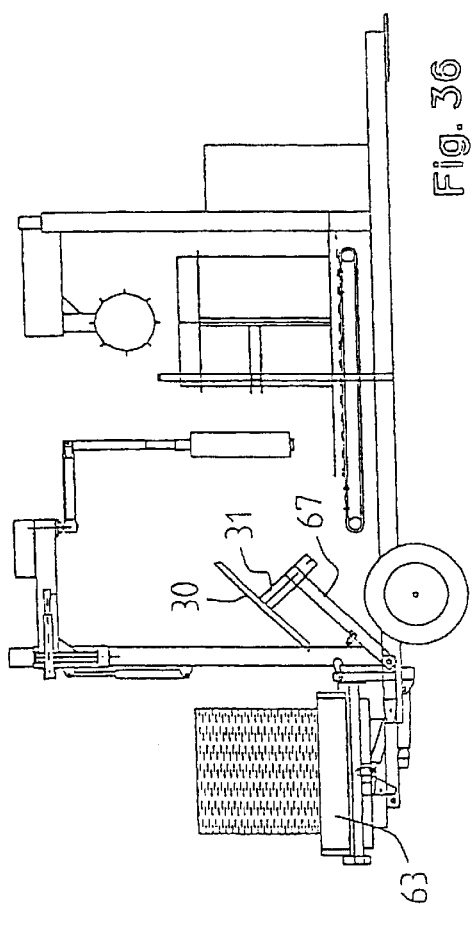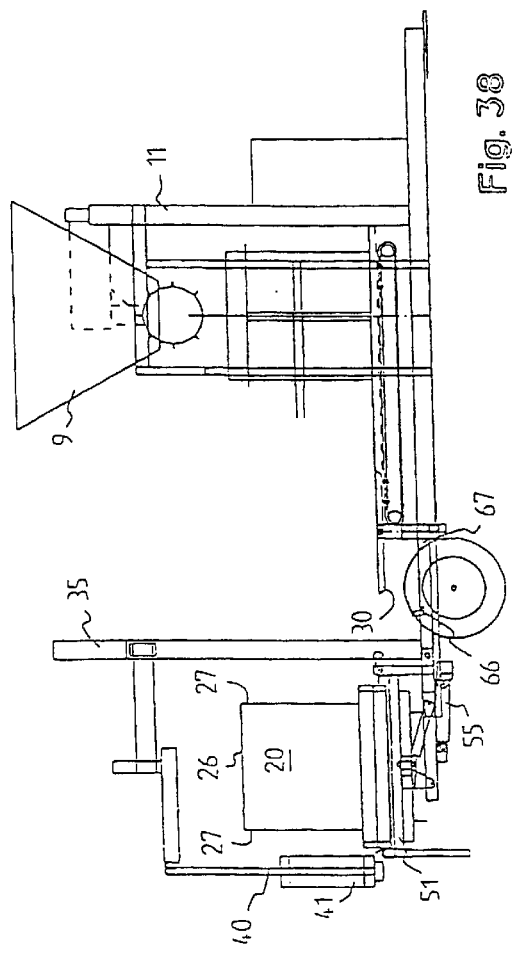

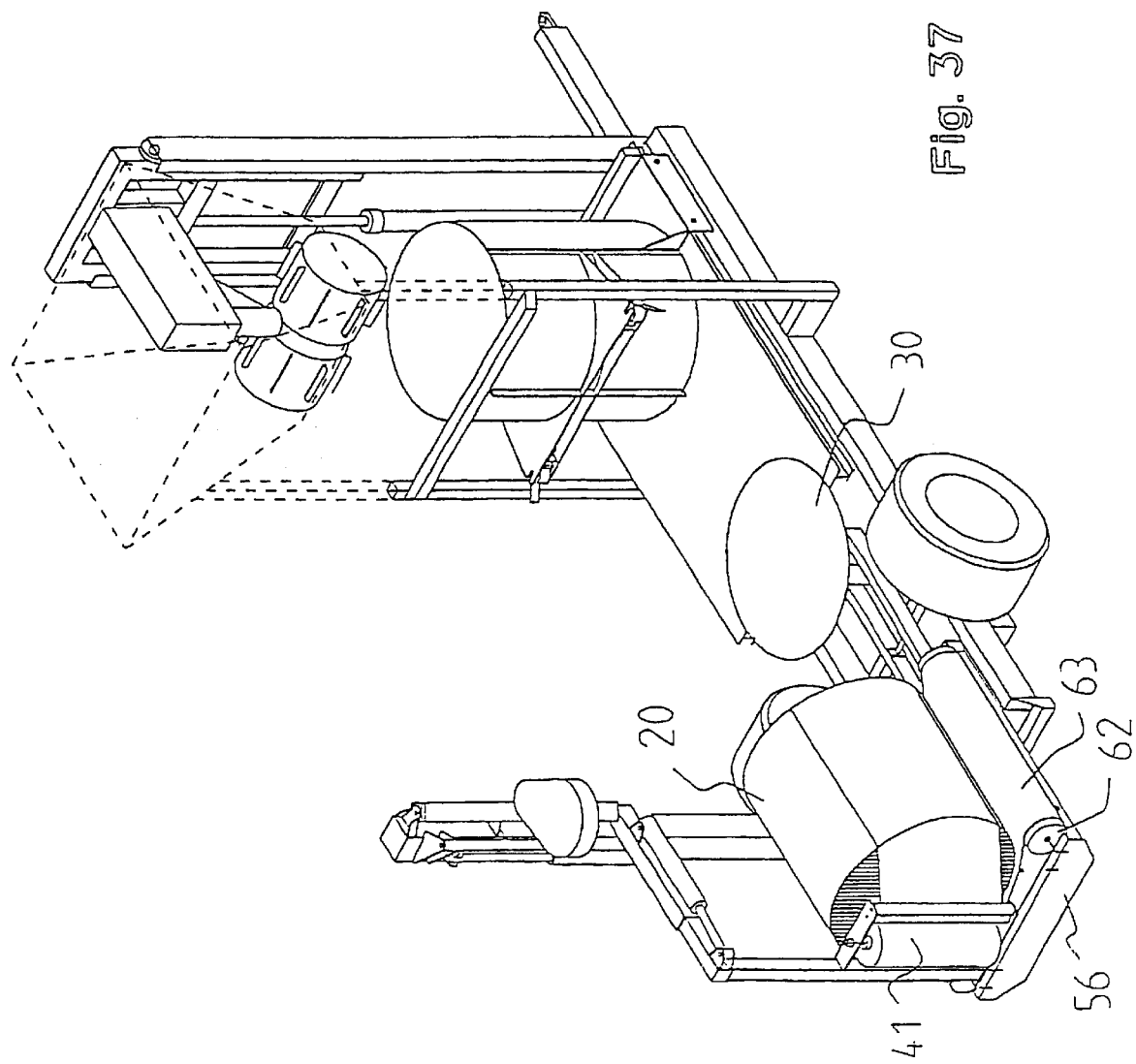

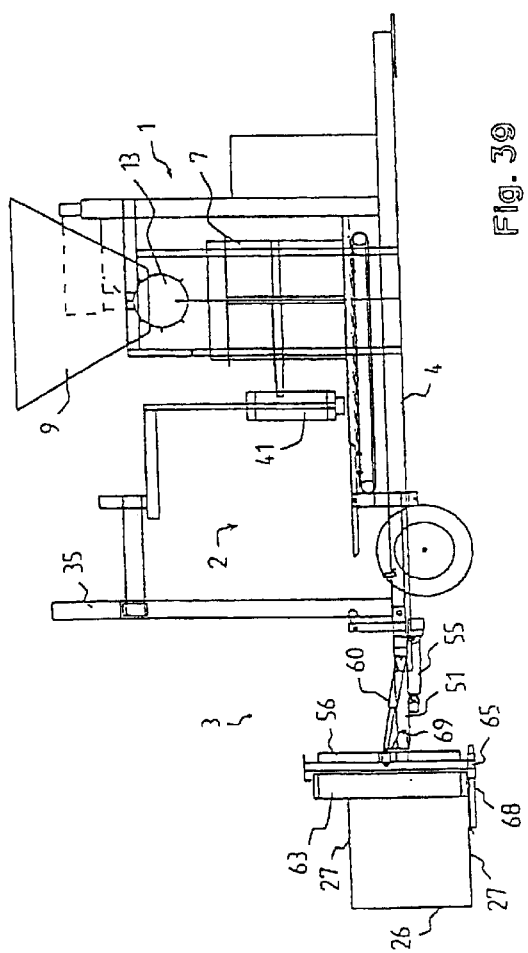
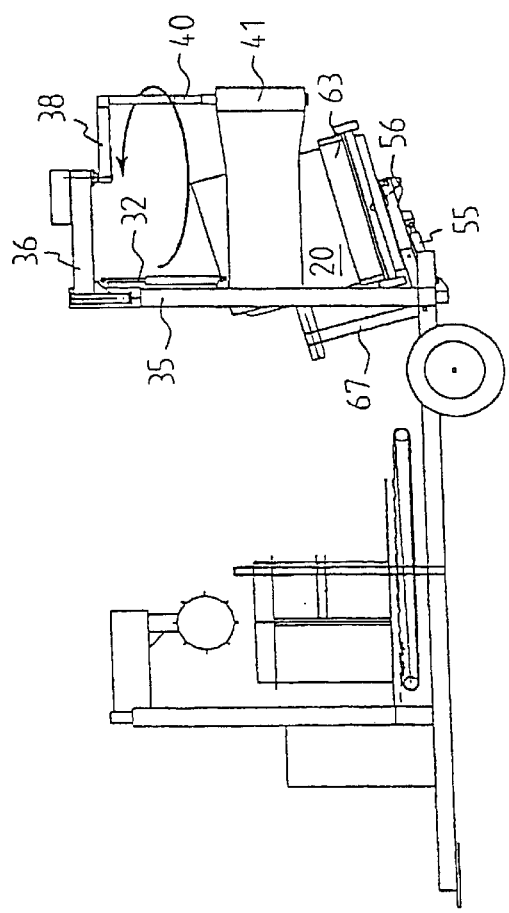

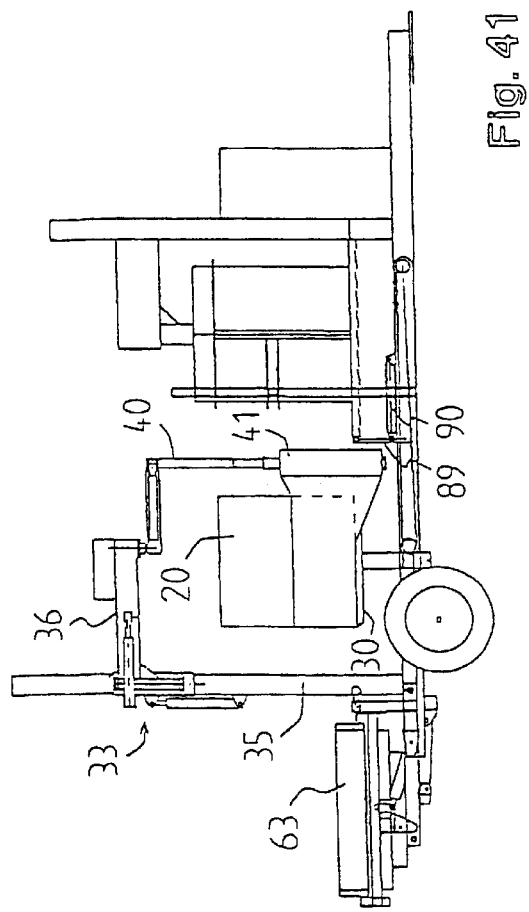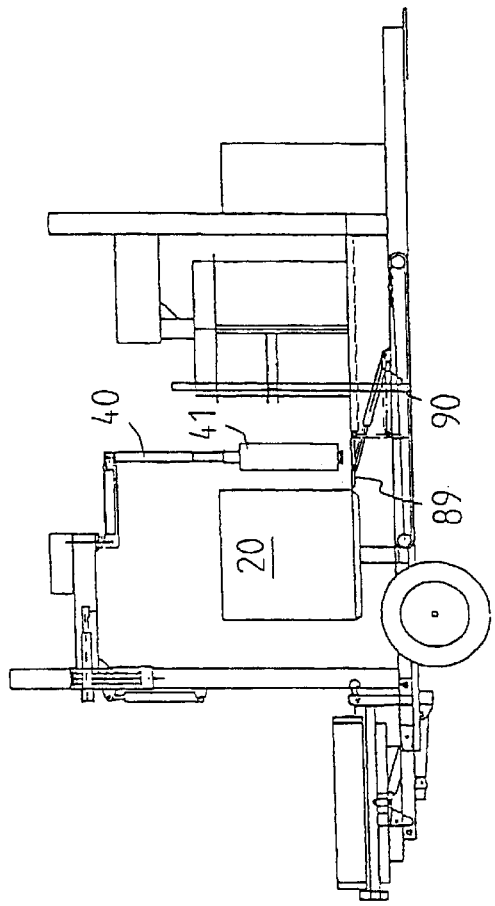

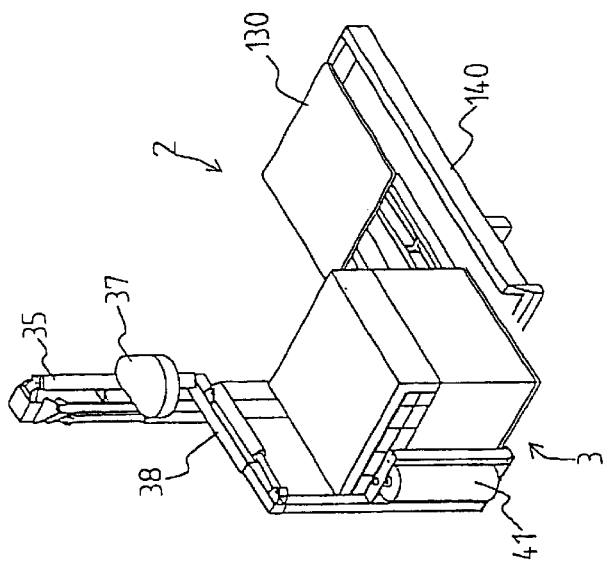
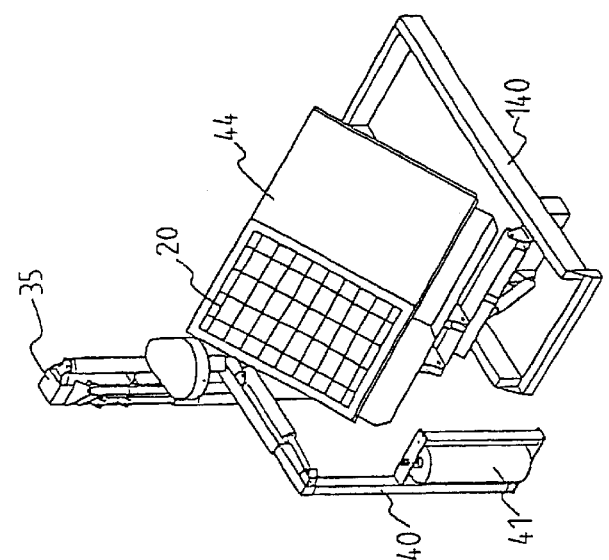
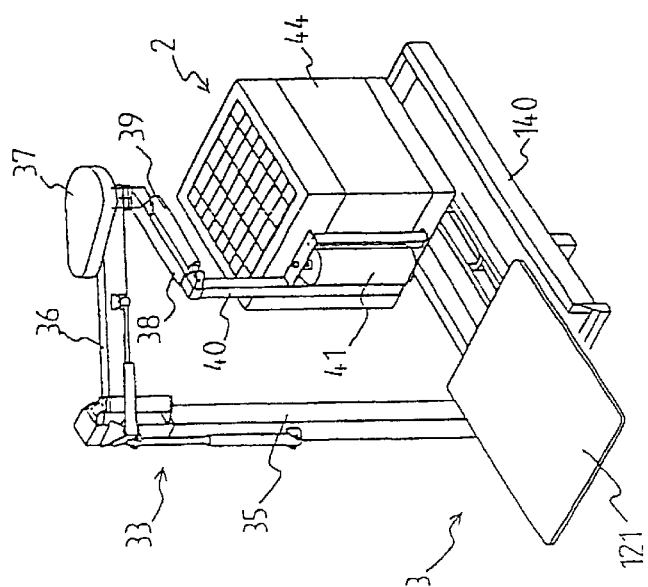
Fig. 43
Fig. 44
Fig. 45

WRAPPING MACHINE

This application is a division of co-pending Application No. 09/994,854 now U.S. Pat. No. 6,499,276, filed on Nov. 28, 2001, which is a Division of Ser. No. 09/463,361 now U.S. Pat. No. 6,341,470, filed Jan. 24, 2000. Application No. 09/994,854 is the national phase of PCT International Application No. PCT/IE98/00066 filed on Jan. 24, 1998 under 35 U.S.C. §371. The entire contents of each of the above-identified applications are hereby incorporated by reference.

FIELD OF THE INVENTION

The invention relates to a wrapping machine, in particular to a bale wrapping machine. The invention also concerns a combined compacting and wrapping machine for compacting material into bales and wrapping the bales with plastics film. The invention is particularly concerned with a machine for forming bales of agricultural silage, grain, hay, straw, maize, beet pulp, beet tops, and the like (hereinafter referred to as "fodder") and wrapping the formed bales with a plastics film, which preferably is air tight and water tight. The machine of the invention may also be used for compacting and wrapping general farm and agricultural waste products, such as waste plastics and the like, and for compacting and wrapping other loose materials and objects such as comminuted peat moss, saw dust, wood shavings, wood chippings, brewery waste, bricks, blocks, cartons and the like.

BACKGROUND OF THE INVENTION

It has become conventional practice in agriculture to form harvested fodder into cylindrical-shaped bales, and square or rectangular bales, which are then wrapped in a plastics film. This is particularly suitable method of manufacturing silage because the silage is kept air-tight within the wrapped bale which, typically, is wrapped with up to six plies of plastics. The cylindrically shaped bales are commonly called "big round bales".

In the present method of producing wrapped bale fodder, such as silage, at least three machines are used. Firstly the grass or other fodder for use as silage is cut, in a field, by a cutting machine. A conventional baling machine then traverses the field, picks up the cut grass, compacts it into a round bale, ties it with twine, and deposits it on the ground. A bale wrapping machine then traverses the field, picks up the compacted and tied bales, and wraps the bales with several layers of a plastics film, and drops the wrapped bales on the ground. The wrapped bales are subsequently gathered and brought to a storage area. Alternatively, the compacted and tied bales may be transported to the storage area before wrapping and are wrapped in the storage area by a bale wrapping machine.

A typical conventional round baling machine is disclosed, for example, in U.S. Pat. No. 4,566,380 B. The grass or other fodder to be harvested is lifted from the ground by a collecting device, and fed to a pressing chamber of the machine where it is wound into a cylinder by rotatable rollers, disposed in a circular array, to form a round bale. When a bale of the desired diameter or density is formed a binding cord or twine is wound around the bale to keep it intact during further handling. The bale is then discharged onto the ground.

Machines for wrapping the large bales, formed by the baling machine, with a plastics film are described, for example, in EP 0539549B, GB 2191984A, GB 2228246A and EP 0209034A (GB 2159489B).

Bale wrapping machines of the kind described comprise a wheeled chassis which may be towed by a tractor. The chassis carries a tipping platform which, in turn, supports a turntable. The turntable is rotatable about a vertical axis. The turntable carries a pair of spaced rollers each of which rotates about a horizontal axis. An endless belt is stretched between the rollers and rotates with the rollers. In order to wrap a large round bale of fodder material with plastics film, the round bale is lifted onto the turntable by means of lifting arms. The bale rests on the endless belt. The free end of a roll of plastics film is attached to the bale and the turntable is then rotated about a generally vertical axis to cause the sheet of film to be wrapped around the bale. However, if no movement of the bale about its longitudinal axis were to occur the bale would merely be wrapped with a single band having the thickness of the width of the plastics film. However, on each rotation of the turntable the endless belt is caused to move for a predetermined distance which, in turn, causes the bale to roll about its surface, i.e. about a horizontal axis. This rolling of the bale on the belt allows a new area of bale to be wrapped by the film on each rotation of the turntable, thus eventually achieving a complete covering of the bale with substantial degree of overlap of the plastics film.

In the bale-wrapping machines described above the bale to be wrapped is mounted on a turntable which rotates about a vertical axis, and the dispenser for the roll of plastics film is fixed. It is the rotation of the bale about the vertical axis which causes the film to be unrolled from the dispenser. However, it is also known from the prior art, for example in EP-B-0110110, DE 3642513A, and GB 2193683A, for the bale to be mounted on rollers which rotate the bale only about the horizontal axis. In this arrangement there is provided a rotary support arm for the film dispenser which rotates the film dispenser, about a vertical axis, around the bale, while the bale is being turned about a horizontal axis.

The conventional methods of producing wrapped bale fodder as described above suffers from a number of disadvantages. Firstly, it is an expensive operation because of the number of machines, tractors, and manpower utilised. A conventional bale wrapping machine of the kind described above is capable of wrapping about 40 large round bales of fodder per hour. To produce 40 round bales per hour requires the services of two conventional round baling machines, each of which requires a tractor and, a driver for the tractor. Because the conventional baling machines use a pressing and winding system to compact and form the bale of fodder, the density of bale obtained is not particularly high. In other words, the volume or weight of fodder contained in the formed bale is not as high as desired. Furthermore, with conventional bale wrapping machines there is a high degree of overlap of the plastics film resulting in a high cost.

With conventional baling machines it is necessary to tie the bales with twine, or enclose it within netting material as otherwise the bale will break apart upon ejection from the baling machine or during further handling. The necessity to tie the bales in the conventional baling machines adds to the cost of the machine because a tying mechanism must be provided in the machine. For the user there is the additional cost of providing twine or cord.

More particularly, the provision of twine or cord on conventional large round bales is a great inconvenience to the farmer because he must cut off the twine before feeding out the fodder. Also, because the bales are formed by winding the fodder into a cylindrical shape the bale may be unrolled during the feeding out operation, and special machines are used for this purpose, as described in GB 2158111 A. Alternatively the bale is shredded. It is almost impossible to remove all the twine from the bale without breaking or unrolling the bale in some way.

Another disadvantage of conventional baling machines is that they are unable to handle crops which are cut to a short length such as maize silage or short cut grass (i.e. "precision chopped" material), because it is difficult to tie such bales with twine. Also, conventional baling machines have a compaction chamber of a fixed size and are capable of producing a bale of a fixed size only.

Compactors for use in compacting waste products such as bulk waste and garbage by means of rollers which press down and simultaneously rotate axially within a compaction chamber are known. Such compactors are described for example in WO 93/099328 (EP 0618863 B), and EP 106268. However, such compactors are not known for use in compacting round bales of fodder for subsequent wrapping. U.S. Pat. No. 3,881,409 B discloses a silage compression apparatus for compressing forage into a compact stack comprising a plurality of rollers which rotate around the inside of a cylindrical confining ring. However, this apparatus is for use in producing pit silage and is not suitable for producing bales of silage which can be handled or wrapped in, plastics film.

OBJECT OF THE INVENTION

It is an object of the invention to overcome certain of the disadvantages of the known apparatus and to provide an improved wrapping machine for wrapping bales of loose material. It is also an object of the invention to provide a combined compacting and wrapping machine for compacting fodder and other materials into compact bales and wrapping the bales in plastics film. It is a further object of the invention to obviate the need for tying the bale with cord or twine, or enclosing the bale in netting, or other secondary containment means before wrapping.

SUMMARY OF THE INVENTION

The invention provides a wrapping machine for wrapping materials, in particular compacted bales of material, with a strip of wrapping material characterised in that it comprises a first wrapping station having wrapping means for applying a strip of wrapping around the bale to partially wrap the bale in wrapping material, a second wrapping station having wrapping means for applying a strip of wrapping material around the bale to completely wrap the bale in wrapping material, and transfer means for transferring the partially wrapped bale from the first wrapping station to the second wrapping station.

The first wrapping station includes a wrapping platform for supporting the bale during partial wrapping of the bale, and the second wrapping station has support means for the bale and means for rotating the bale about a substantially horizontal axis, and the transfer means is swingable, to transfer the bale, through approximately 90° from the first wrapping station to the second wrapping station.

The support frame for the bale at the second wrapping station is pivotable from a normally horizontal position, through approximately 9020, to a position in which engagement means on the support frame engage with complementary means on the wrapping platform, and the wrapping platform is pivotally mounted, such that when the support frame is returned to its original horizontal position it causes the wrapping platform to swing from a normally horizontal position, through approximately 90°, to deposit the partially wrapped bale onto the support frame at the second wrapping station The first wrapping station includes wrapping means comprising a dispenser for dispensing a strip of wrapping material, such as a plastics film, and means for rotating the dispenser, about a substantially vertical axis, around the bale to partially wrap the bale, and the second wrapping station includes means, for rotating the bale about a substantially horizontal axis, and at least one dispenser, for dispensing a strip of wrapping material and means for rotating the dispenser around the bale, as the bale is turned about the horizontal axis.

In another embodiment, the invention provides a combined compacting and wrapping machine for compacting material, such as fodder, loose materials, and the like, into a bale and wrapping the bale with a wrapping material, such as plastics film comprising a compacting station including a compactor for compacting loose material into a bale and means for moving the compacted bale from the compacting station to at least one wrapping station having means for wrapping a strip of wrapping material, suitably a plastics film, around the bale. The compacting station and wrapping station are combined in a single machine by mounting them on the same chassis or platform.

In one embodiment, the machine includes a first wrapping station where partial wrapping of the compacted bale takes place, a second wrapping station where wrapping is completed, and means for transferring the partially wrapped bale from the first to the second wrapping station.

In another embodiment, the machine includes first wrapping means located at the compaction station for partially wrapping the compacted bale at the compaction station, and transfer means for transferring the bale to a second wrapping station where wrapping is completed.

Preferably, the compactor comprises a compaction chamber, open at the top, means for directing loose material into the chamber, a rotating compaction head including at least one roller rotatable over the loose material within the compaction chamber, and capable of moving within the compaction chamber to compact loose material accumulating within the chamber. Suitably, the compaction chamber is vertically oriented. Preferably, the rotating compaction head is carried on at least one (but optionally two) downwardly extending support arm which extends into the chamber, and the support arms is slideable in a vertical direction along a vertical support column mounted on the machine. Suitably, the compaction head, which rotates about a substantially vertical axis, carries two rollers which are rotatable about substantially horizontal axes.

In another embodiment, the compaction chamber is provided with doors opening in a side thereof, and is moveable along the machine from the compacting station to the first wrapping station so as to deposit a compacted bale of material at the first wrapping station.

The first wrapping station includes a wrapping platform for supporting the bale during wrapping, wrapping means comprising a dispenser for dispensing a strip of wrapping material, such as a plastics film, a rotary support arm for the dispenser, and means for rotating the support arm and dispenser, about a substantially vertical axis, around the bale.

The invention includes a second wrapping station, means for swinging the said wrapping means from the first wrapping station to the second wrapping station, and means at the second wrapping station for rotating the bale about a substantially horizontal axis while the dispenser is rotated, about a substantially vertical axis, around the bale. The means for rotating the bale about a horizontal axis may include a conveyor.

The invention also includes means for transferring the partly wrapped bale from the first wrapping station to the second wrapping station, including turning the bale through approximately 90°. The transferring means includes a support frame for the conveyor, which is pivotable from a normally horizontal position, through approximately 90°, to a position in which it engages the wrapping platform which is pivotably mounted on the machine, and means for swinging the wrapping platform, and any bale carried on the platform, together with the support frame, back to the normal horizontal position of the support frame to deposit the bale on the conveyor.

In a preferred embodiment, the compaction chamber is moveable upwardly in a vertical direction as the bale is being formed to expose a part of the partially-formed bale, and wrapping means are included to wrap an exposed part of the bale with wrapping material as the compaction chamber is raised. In particular, the top and bottom corner portions of the bale are wrapped at this location. Thus, in this embodiment the first wrapping station is coincident with the compaction station. Transfer means are provided, as described above, for transferring the partially wrapped bale to the second wrapping station.

The invention includes methods of forming and wrapping bales of fodder and other materials comprising the use of apparatus as described above.

BRIEF DESCRIPTION OF THE DRAWINGS

Some embodiments of the invention are hereinafter described with reference to the accompanying drawings, wherein:

FIG. 12 is a side elevation of the machine showing transfer of a bale to a second wrapping station;

FIG. 13 is a side elevation of details of a transfer mechanism;

FIG. 14 is a plan view of a wrapping platform of FIG. 13;

FIGS. 15 and 16 are a side elevation and rear perspective view, respectively, showing the wrapping of a bale at the second wrapping station;

FIG. 17 is a side elevation showing details of a tipping mechanism;

FIG. 18 shows a detail of the drive means for a rotating compaction head;

FIG. 21 shows a side elevation of a second embodiment of a combined baling and wrapping machine of the invention showing one method of use;

FIG. 22 is a view similar to that of FIG. 21 showing an alternative method of use;

FIG. 24 is a side elevation of the machine of FIG. 23;

FIG. 25 is a plan view of the machine of FIG. 24;

FIGS. 27 and 28 are a perspective view, and side elevation, respectively, of the machine showing the transfer of a bate from a compacting station to a first wrapping station;

FIGS. 32 and 33 are side elevations of the machine showing the wrapping of the top and bottom, respectively, of the bale at the first wrapping station;

FIGS. 34 to 36 are elevations of the machine showing the transfer of a partly wrapped bale from the first wrapping station to a second wrapping station;

FIGS. 37 and 38 are a perspective view and elevation, respectively, of the machine showing the wrapping of the bale at the second wrapping station;

FIG. 39 is an elevation of the machine showing the tipping of the fully wrapped bale from the machine;

FIG. 40 is a side elevation showing a modification of the operation of the transfer means for transferring a partly wrapped bale to the second wrapping station;

FIGS. 41 and 42 are side elevations showing a modification of the first wrapping station;

FIGS. 43 to 45 are perspective views of a further embodiment of the invention showing the wrapping of a bale of bricks.

DETAILED DESCRIPTION

Figure 1:
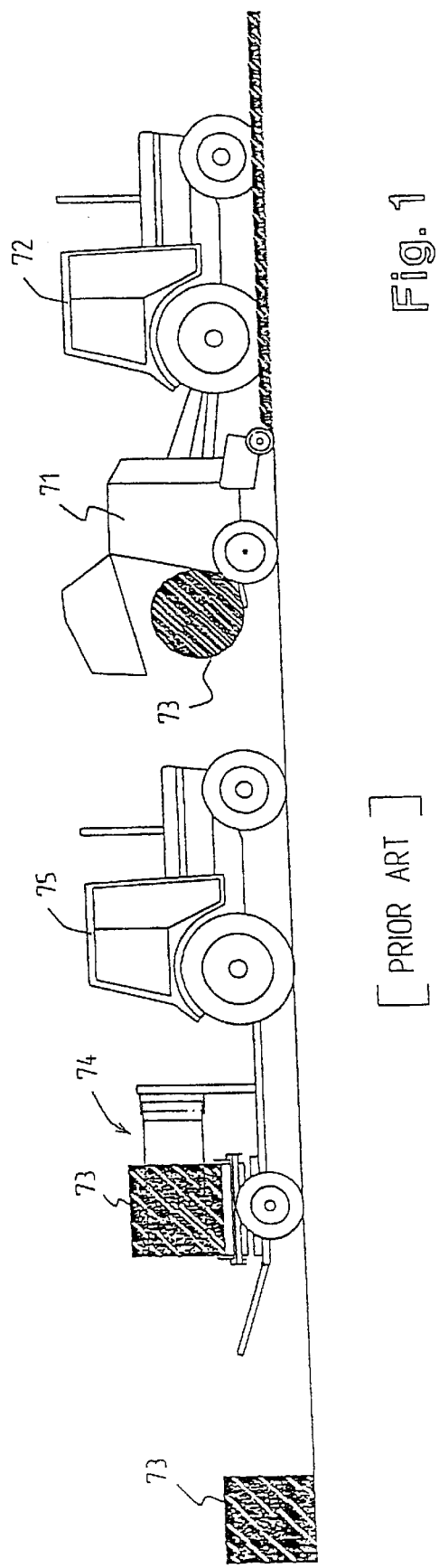
FIG. 1 is a side elevation showing the prior art arrangement for baling and wrapping fodder in the field.

Referring to FIG. 1 of the drawings this shows the known conventional method of baling fodder and wrapping the formed bales in plastics film. Grass, or other fodder crop, is harvested by a conventional mowing machine (not shown) and is left on the ground to wilt. Subsequently, the wilted grass 70 is picked up from the ground by a conventional baling machine 71 which is towed by a first tractor 72. The baling machine 71 forms the fodder into a round bale 73, which is tied with binding twine and tipped onto the ground. The bale is then picked up, off the ground, by the loading arm of a conventional bale wrapping machine 74, which is towed by a second tractor 75. The bale is wrapped in plastics film by the bale wrapping machine 74, and the wrapped bale is tipped onto the ground from where it is subsequently collected. Thus the conventional method requires the utilisation of two separate machines and two tractors, and two operators. As explained above under the background of the invention, if the full capacity of the bale wrapping machine 74 is used, there is a requirement to have two separate baling machines 71 and tractors 72.

A first embodiment of a combined compacting and wrapping machine of the invention, and its method of use, is illustrated generally in FIGS. 2 to 20. The machine, which is towed by a tractor comprises a compacting station 1, a first wrapping station 2, and a second wrapping and tipping station 3. The compacting station 1 includes a vertical compactor 10.

Figure 2:
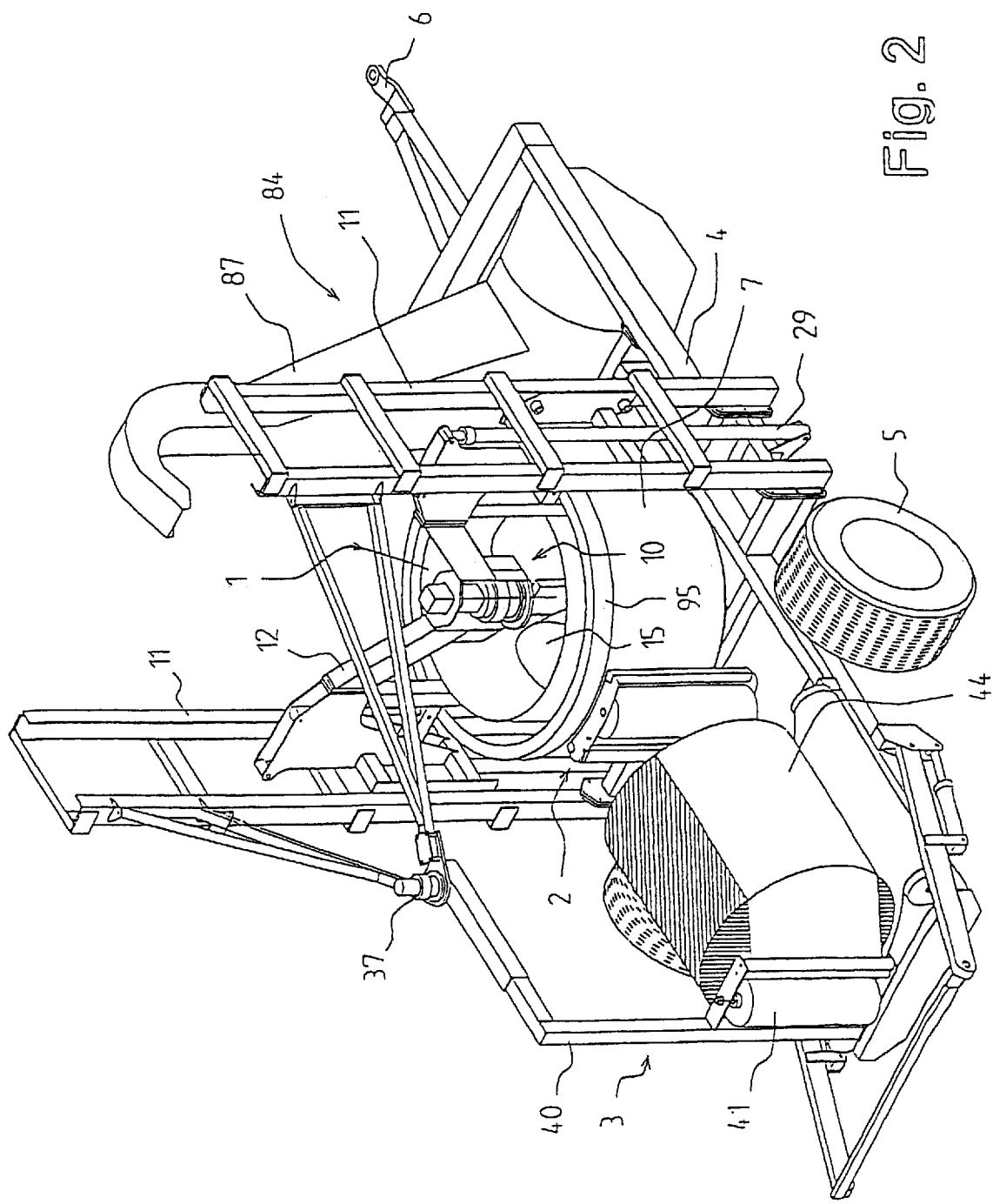
FIGS. 2 and 3 are rear and front perspective views, respectively, of a first embodiment of a combined compacting and wrapping machine of the invention.
Figure 3:
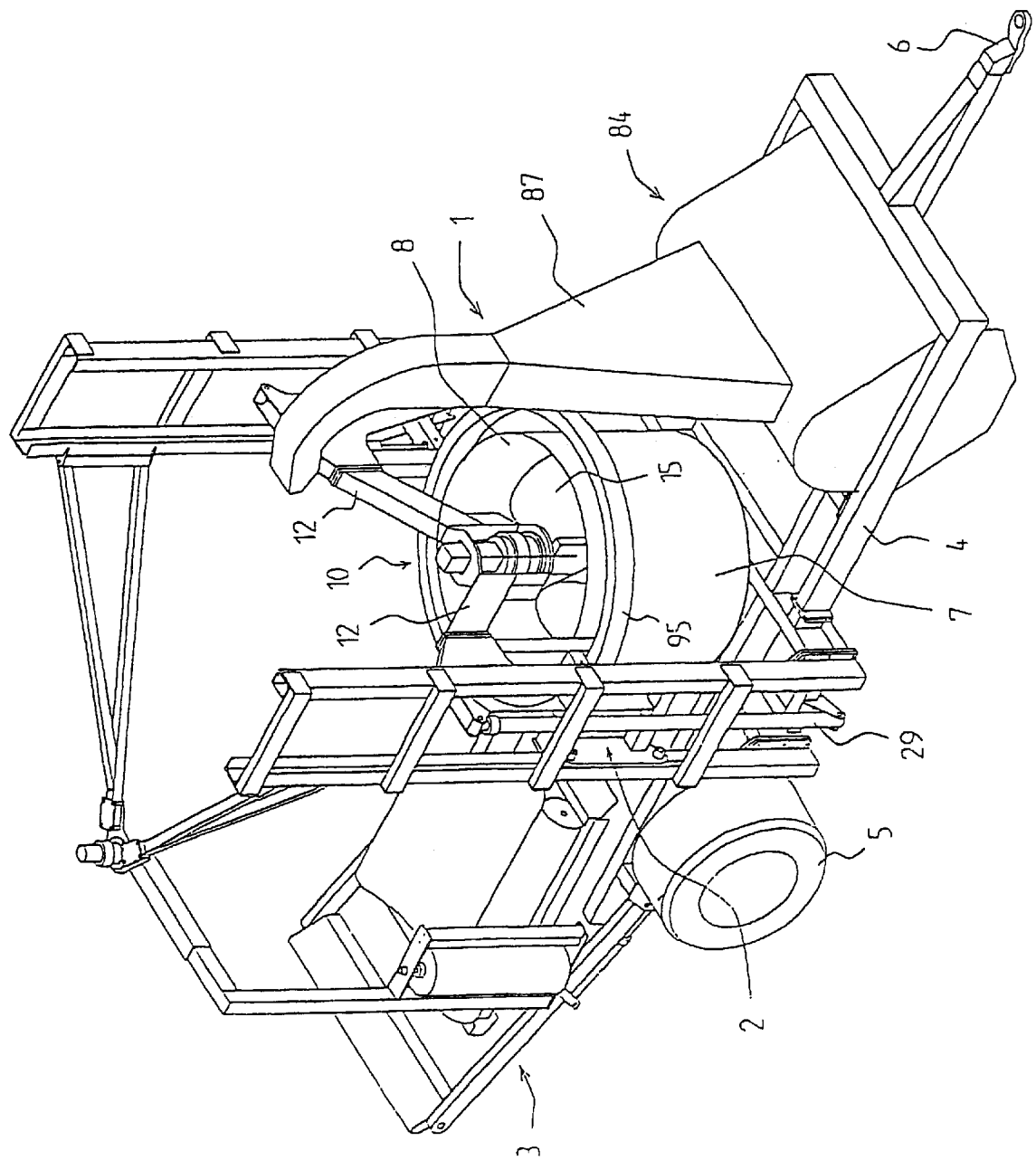

In the embodiment of the invention as shown in FIGS. 2 and 3, the machine of the invention incorporates an integral forage harvester 84. This is similar to that shown in FIG. 22 and comprises an array of tines 85 for picking-up the silage 70, in well known manner. The silage is fed by an auger 86 to a chopping unit 87, where the silage is cut into small pieces by an array of rotating blades which rotate relative to fixed blades. The precision chopped silage is blown by a fan through a chute 87 which feeds it directly to the open top of a compaction chamber 7. Thereafter the chopped silage is baled and wrapped as hereinafter described.

The first embodiment of a combined compacting and wrapping machine of the invention comprises a compacting station 1, a first wrapping station 2, and a second wrapping station 3. The stations 1, 2 and 3 and the component parts thereof as described below are all mounted on a chassis 4 having a pair of wheels 5. The chassis has a hitch 6, at a front end thereof, for attachment to a tractor 80 (see FIG. 22). In this embodiment the compacting station 1 and the first wrapping station 2 are located coincident with each other.

Referring particularly to FIGS. 2 and 3, the compacting station 1 comprises a vertical compacting chamber 7. The chamber 7 is substantially cylindrical in shape with an open top 8. It is also open at the bottom.

A compactor 10 is positioned in the open top 8 of the compacting chamber 7. The compactor 10 is supported on a pair of vertical support columns 11 mounted to each side of the chassis 4. A pair of downwardly inclined support arms 12 are each mounted on a respective column 11 and each is slideable in a vertical direction along the columns 11 by means of hydraulic rams 29. The supports arms 12 carry a rotating compaction head 15 consisting of rollers 13 formed with cleats 14 on the surface thereof (see FIGS. 18 to 20).

As shown in FIG. 18, a hydraulic motor 87 fed from a hydraulic power pack driven by the tractor or its own engine is mounted on top of a cylindrical housing 84 on the end of inclined support arms 12. This motor drives a "T" Gearbox 85 with counter rotating output shafts onto which the rollers 13 are mounted. The housing of the gearbox 85 is attached to a hollow shaft 86 which is free to rotate in housing 84. The shaft of motor 87 is connected to the input shaft of gearbox 85 through hollow shaft 84 by shaft 88. Thus hydraulic motor 87 simultaneously rotates compacting head 15 and rollers 13 when rollers 13 are in contact with forage in compacting chamber 7.

Figure 20:
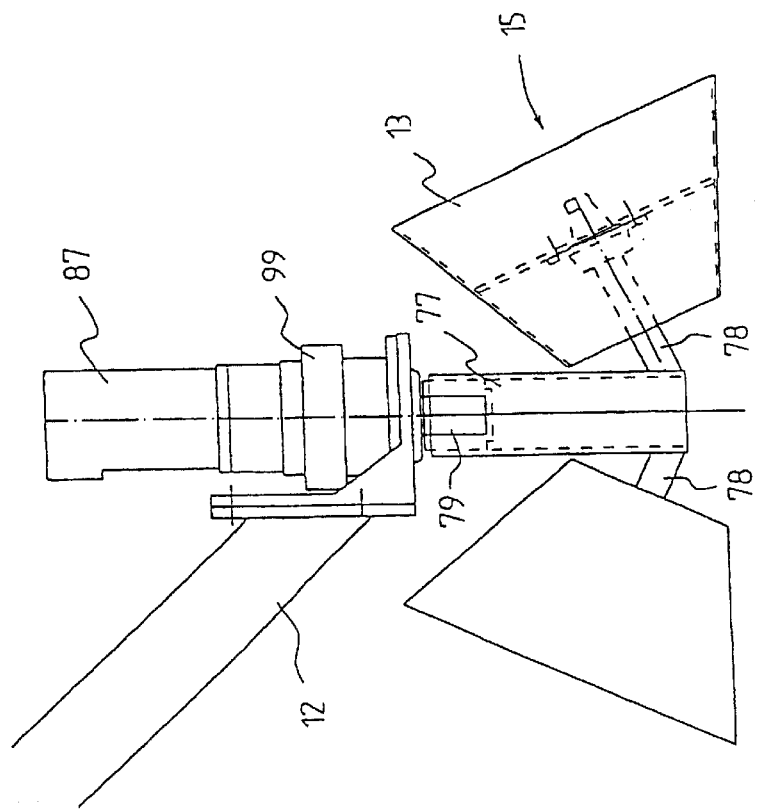
FIGS. 19 and 20 show details of modifications to the rotating compaction head.
Figure 19:
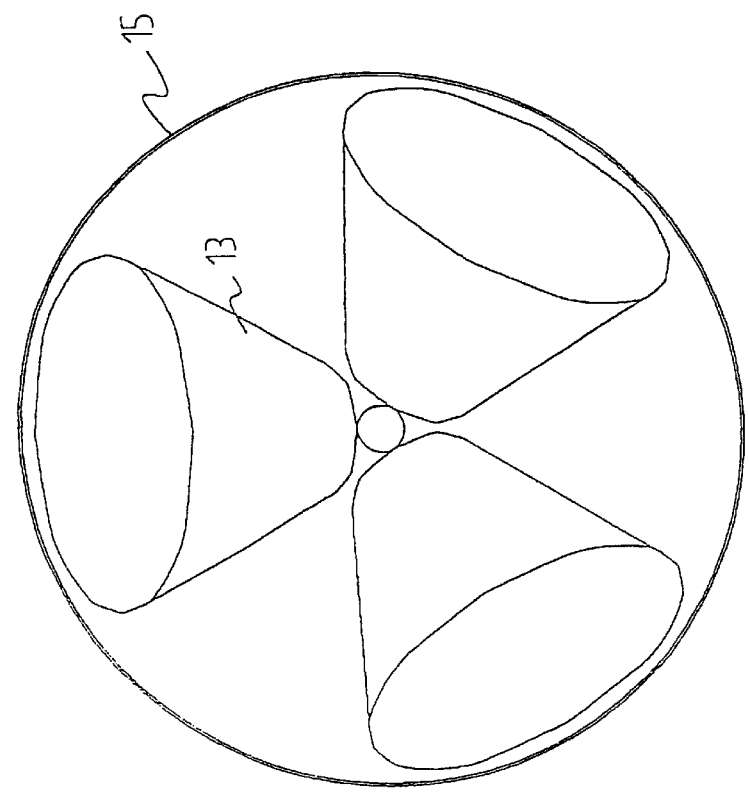
Figure 23:
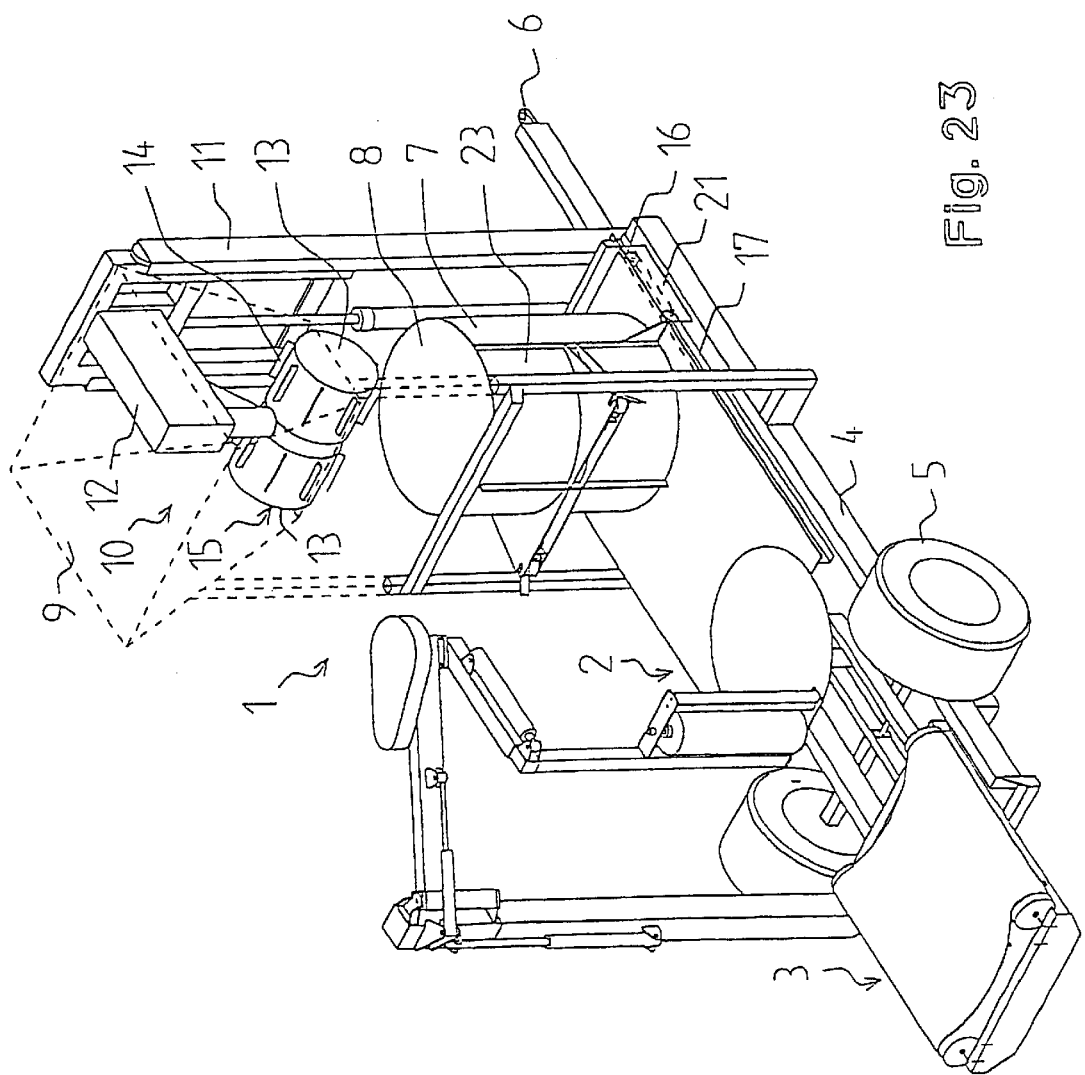
FIG. 23 is a perspective view of the second embodiment of a combined agricultural baling and wrapping machine of the invention.

FIGS. 19 and 20 show details of alternative arrangements of the wheel rollers 13 of the rotating compacting head 15. The particular roller arrangement used will depend upon the material to be compacted because it has been found that certain roller arrangements or combinations operate more satisfactorily that others for certain materials.

The compacting wheels or rollers 13 may be of different shapes, e.g. they may be of cylindrical or of conical shape. The number of rollers 13 may vary, e.g. the compacting head 15 may support two, three or four rollers 13. The drive arrangement for the roller 13 may also vary. For example, the compacting head 15 may be powered for rotation while the rollers 13 are freely rotatable but not powered. Alternatively, the rollers 13 are powered for rotation while the head 15 is freely rotatable but not powered. In yet another arrangement both the head 15 and the rollers 13 are powered for rotation.

FIG. 19 shows an arrangement of compacting head 15 in which the head 15 is rotated by hydraulic motor 87 as described above. In this embodiment there are three freely-rotatable conical rollers 13.

In the embodiment shown in FIG. 20, the rotary head 15 is driven by a hydraulic motor 87 mounted on the end of the support arm 12. The motor 87 is connected to a planetary reduction gear box 99, which has a drive-output spigot 79. A drive shaft 77 is detachably mounted to the spigot 79, for example by a retaining screw. Rollers 13 are carried on the lower end of the shaft 77 by inclined stub axles 78. A roller 13 is journalled for free rotation on the end of each axle 78. Thus, rotation of the shaft 77 causes the compaction head 15 to rotate. In the drawing two rollers 13 are shown. However, the head 15 may easily be detached from the spigot 79 and replaced with a head 15 containing three or more rollers. The rollers 13 may be fitted with cleats where appropriate.

In this first embodiment the cylindrical compaction chamber 7 is moveable in a vertical plane, and the first wrapping station 2 is disposed coincident with the compaction chamber 7 to wrap the bale 20 as it is exposed by raising of the chamber 7.

As shown in FIGS. 2 and 3, the cylindrical compaction chamber 7, which is open at top and bottom, is attached to the arms 12 and is moveable vertically on the columns 11 by means of the hydraulic rams 29. In its lowered position the chamber 7 fits over a wrapping platform 30 of the first wrapping station (see FIG. 4). The platform 30 is fixed, and is circular in plan and in the lowermost position of the chamber 7 it fits within the bottom of the chamber 7.

Figure 4:
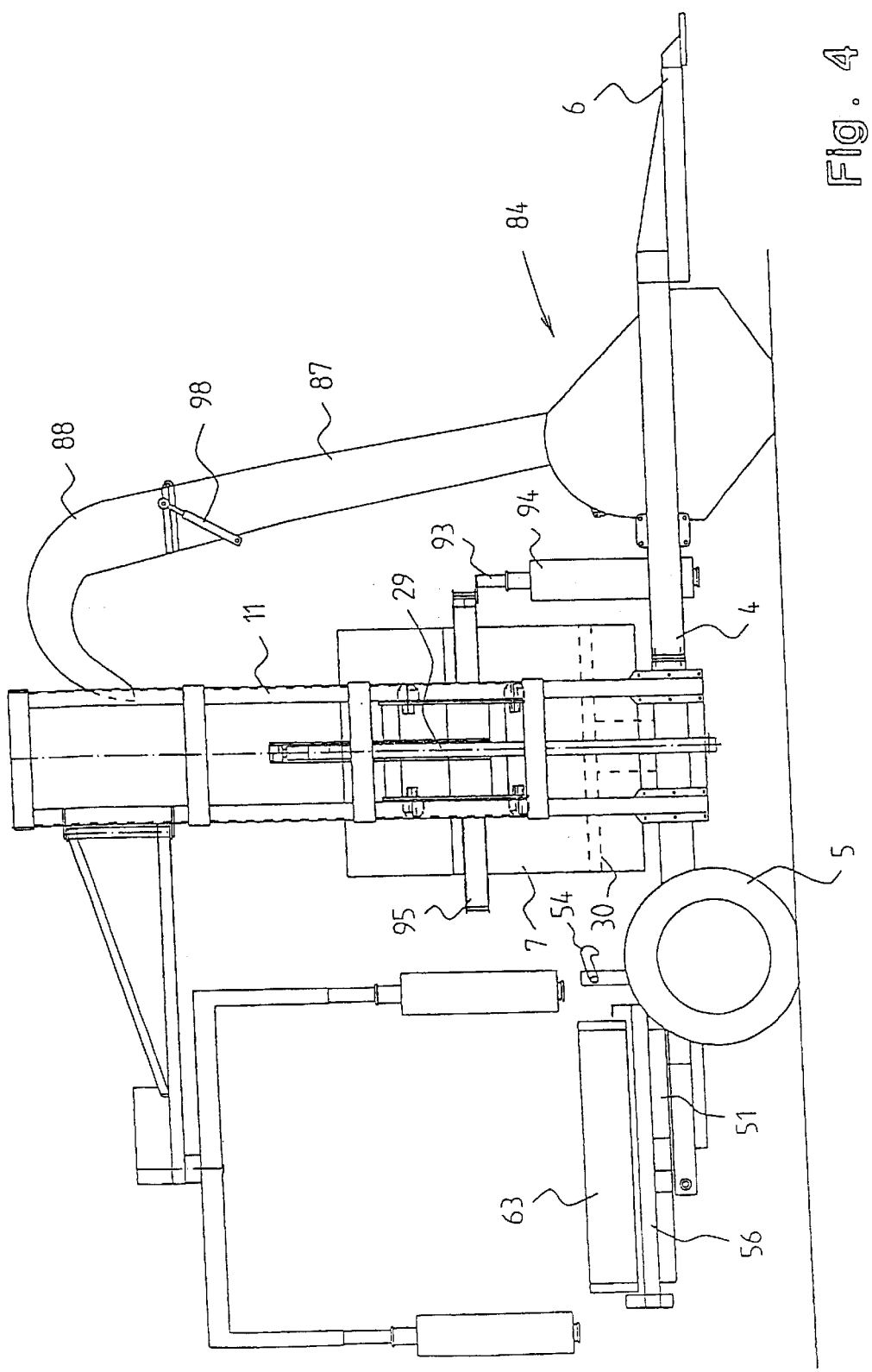
FIGS. 4 to 8 are side elevations of the machine of FIG. 2, at different stages in the wrapping operation.

In this embodiment a first bale wrapping means is provided at this location. As shown in FIG. 4, this comprises a vertically disposed support arm 93 which carries a film dispenser 94. The support arm 93 rotates, in a circular path, around the circumference of the chamber 7. The arm 93 is fixed to a circular ring 95 which is rotatable on rollers (not shown) attached to the outer wall of the chamber 7, adjacent the top thereof. A belt or chain (not shown), driven by a hydraulic motor, runs around the outer circumference of the circular ring 95 causing it to rotate. The circular ring 95 thus carries the arm 93 and film dispenser 94 in a circular path around the outside of the chamber 7.

In use, loose cut grass, silage, or other fodder is blown directly from a separate forage harvester 81 (see FIG. 21), or preferably, by an integral forage harvester 84 (see FIG. 2) of the machine of the invention, into the compaction chamber 7 where it is pressed down by the rotating compaction head 15. The compaction head 15 rotates, about the vertical axis, around the inside perimeter of the chamber 7 with the cleated rollers 13 constantly rolling over the top surface of the grass as it is compacted and builds up in the cylinder to form a bale 20. Simultaneously the rotating compaction head 15, and the chamber 7, are moved by the hydraulic rams 29 vertically upwardly along columns 11 as the grass builds up in the compaction chamber 7 (see FIGS. 9 and 10 which shows the compactor head 15 within the chamber 7). The vertical movement of the rotating compaction head 15 is hydraulically restricted, and acts to exert a downward force on the bale of fodder being formed so that efficient compaction of the fodder to a high density is achieved. The hydraulic ram pressure on the compaction head 15 is adjustable by either hydraulic of electro-hydraulic means. When a pre-set compaction pressure on the compaction head 15 is achieved a signal is sent to lift the hydraulic ram to raise the compaction head 15 until the hydraulic pressure on the compactor head 15 is again below the pre-set value, whereupon the ram presses the compaction head 15 downwardly again. The cleats 14 press the fibres in the grass or other fodder to extract air from the fodder and to remove the "spring back" from the bale which is a problem with some conventional balers. Thus, when the bale is fully formed and the rotating compaction head 15 is lifted off the formed bale 20 there is very little springing back of the fodder and the bale retains its high density.

As the chamber is filled with fodder, the compaction head 15 is operated to compact the material within the chamber 7 as described above. Simultaneously, the chamber 7 is raised vertically along the columns 11 by means of the hydraulic rams 29. The upward travel of the chamber 7 exposes the bottom portion of the partly-compacted bale 20 which rests on platform 30.

The film dispenser 94 is then rotated around the exposed cylindrical surface of the bale to wrap the bale, in well known manner, with plastics film from the dispenser and continues to operate until all of the exposed surface of the bale is wrapped, including an overlap of the bottom and top corners of the bale.

As already noted in FIG. 4, the bottom portion of the chamber 7 overlaps the platform 30 at the start of the compacting cycle. This enables the start of the wrapping operation to be delayed until after the chamber 7 is raised to clear the platform 30 and expose the bale for wrapping. This has the advantage of avoiding contact between the dispenser 94 and rotating dispensers at the second wrapping station.

Figure 5:
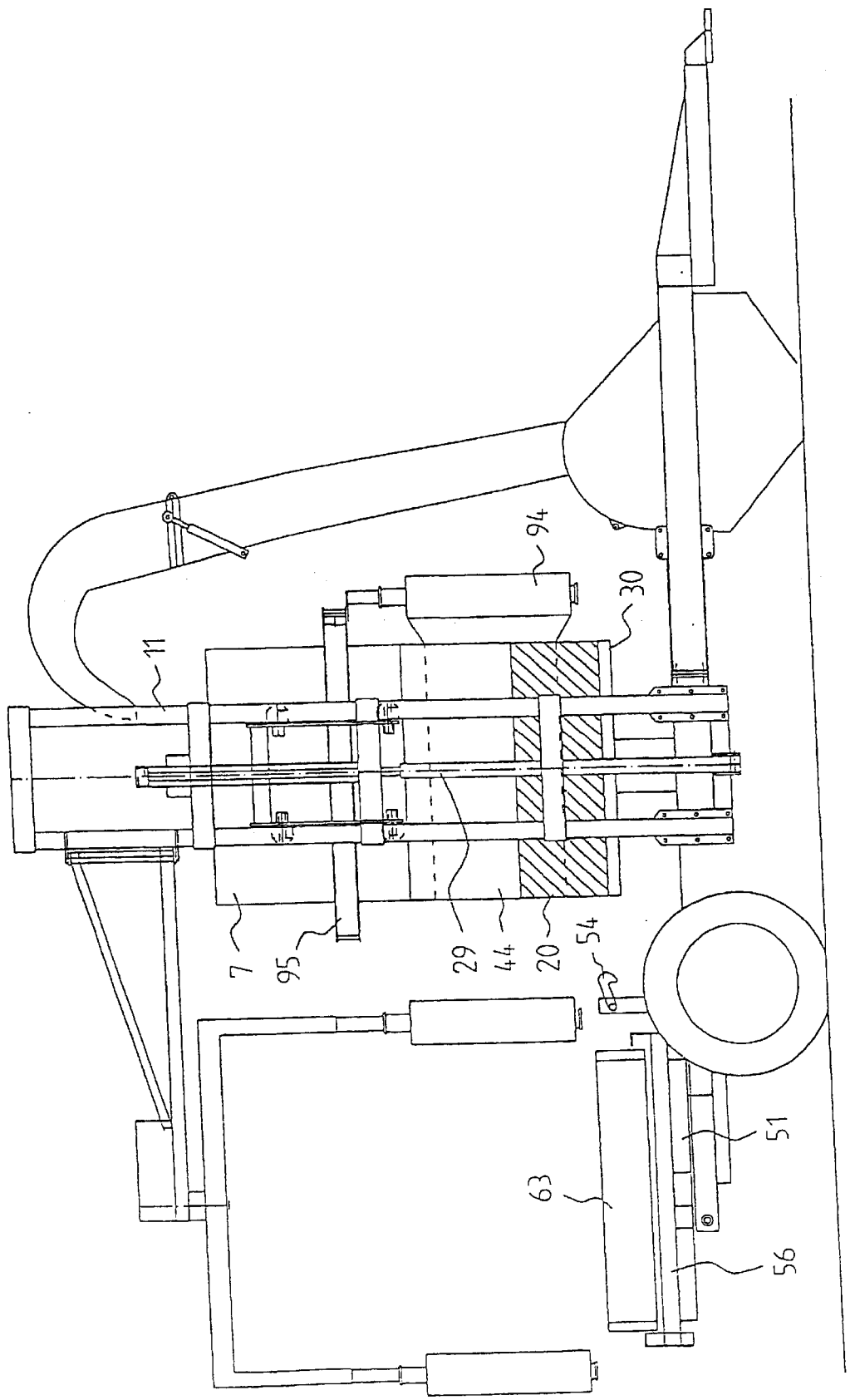
Figure 9:
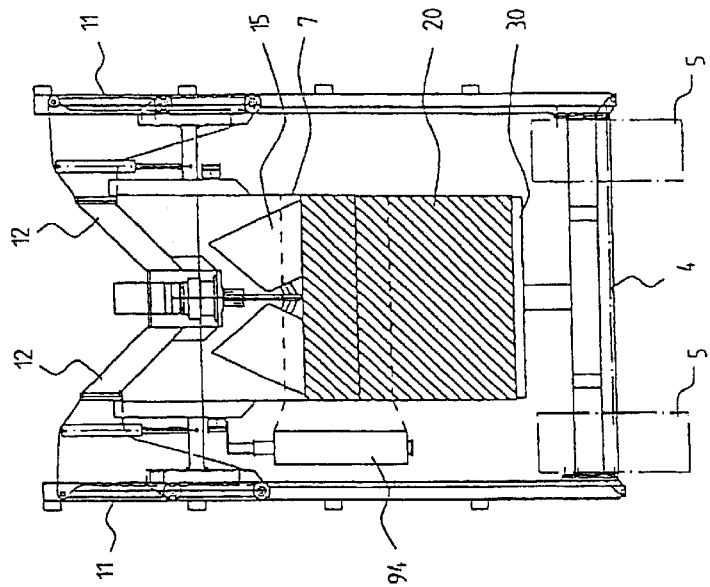
FIGS. 9 and 10. are end elevations of FIGS. 6 and 7, respectively.
Figure 10:
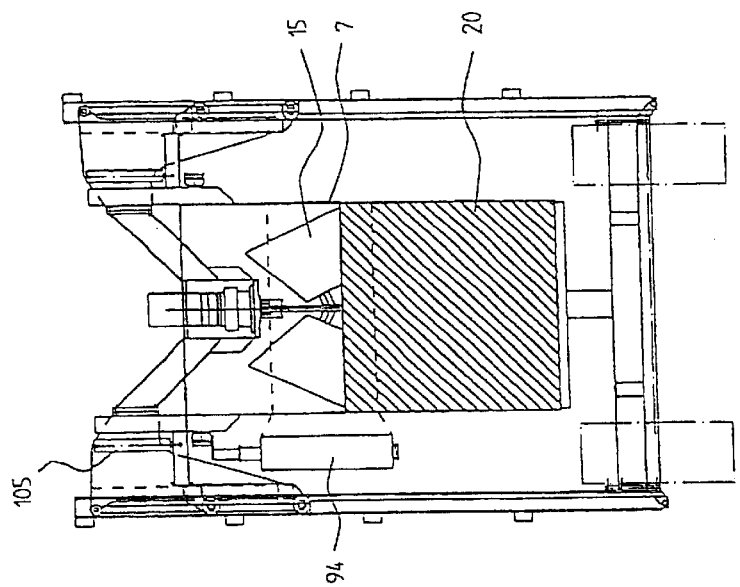

FIG. 5 shows the start of the wrapping operation. The chamber 7 is shown partly raised on the columns 11 by rams 29 to expose the bottom part of the bale 20 which is shown being wrapped by film dispenser 94 with a layer of plastics film 44. It will be noted that the film 44 overlaps the outer surface of a lower part of the chamber 7. As shown in FIGS. 9 and 10, because the dispenser 94 is mounted on the circular track 95 attached to the chamber 7, the dispenser 94 is raised vertically in synchronisation with the chamber 7. As the chamber 7 is raised it detaches from the overlapped portion of wrapping film which is then pressed against the sides of the bale 20. At the end of the wrapping cycle the wrapping film is severed by a cut and start device in well known manner. A suitable cut and start device is described for example in IE S80403.

Figure 6:
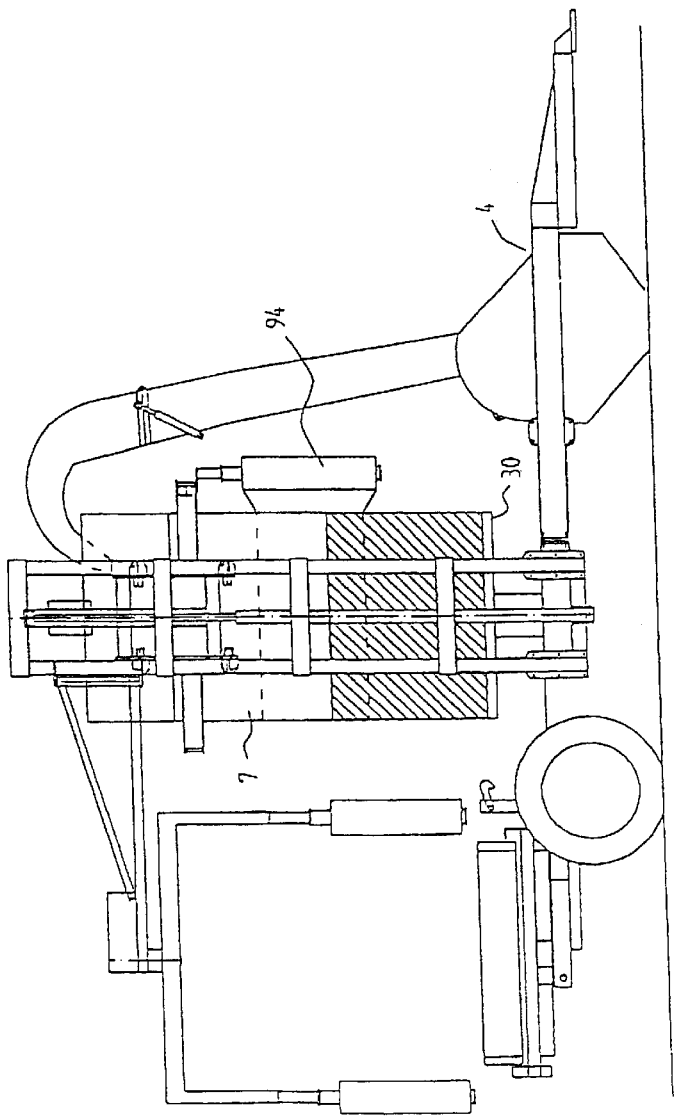

FIGS. 6 and 9 show the bale 20 fully formed but still partially retained within the raised chamber 7. It will be appreciated that during compaction the rotating head 15 rises in unison with the chamber 7, and the rotating head 15 is always spaced a short distance, above the lower edge of the chamber 7 such that a portion of the partly-formed bale 20 is within the chamber (see FIG. 9).

Figure 7:
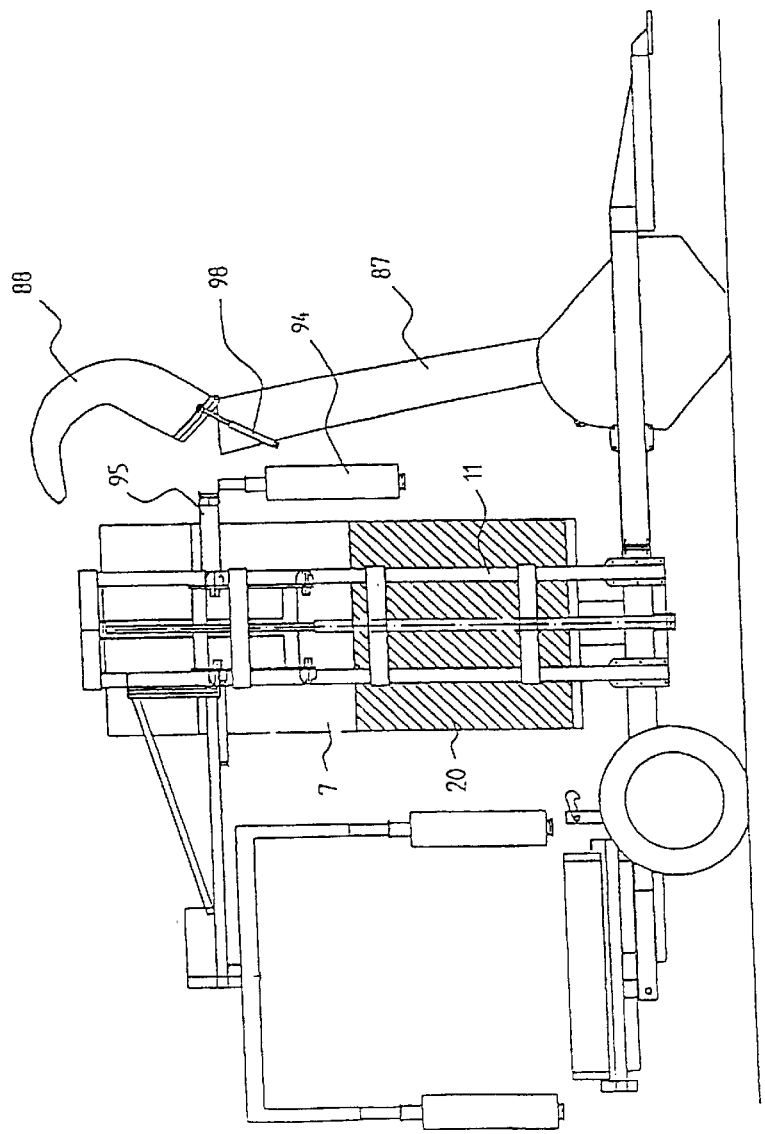

Referring now to FIGS. 7 and 10, these illustrate the position at the end of the compaction step. The bale 20 is fully formed, but the rotating head 15 remains on the top surface of the bale 20. However, the chamber 7 has been lifted by a pair of hydraulic rams 105. This reduces the risk of damage to the bale 20 as the chamber 7 is lifted clear of the bale 20.

Figure 8:
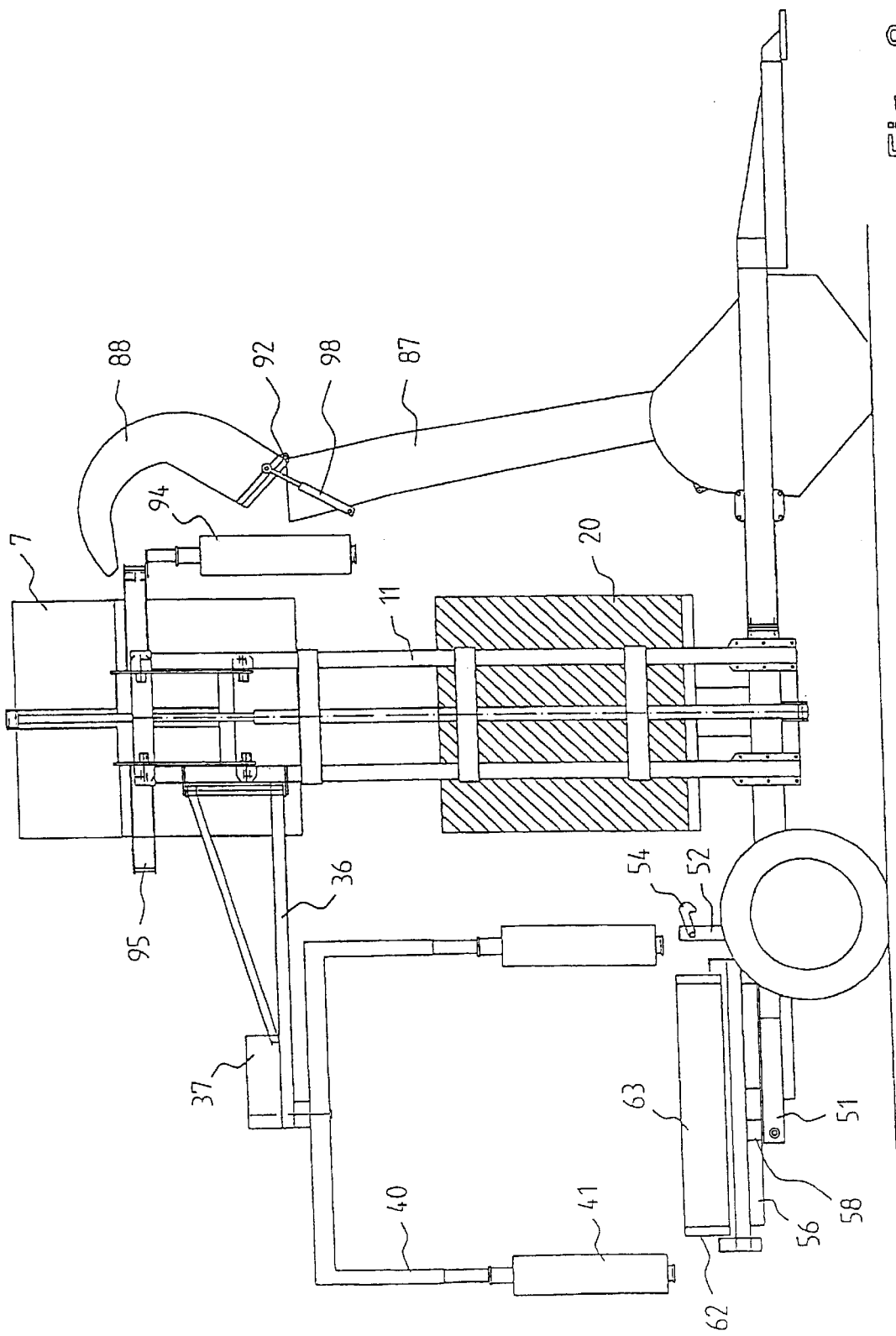

FIG. 8 shows the position when the chamber 7 and rotating head 15 are both raised above the formed and partially wrapped bale 20.

All of the bale 20 has now been wrapped except for the end portions. However, the film 44 has wrapped around the top and bottom corners of the bale as shown most clearly in FIG. 13. The partly-wrapped bale is now transferred to second wrapping station 3. This is achieved by transfer means 50 described below. The transfer means 50 tilts the bale 20 onto a conveyor belt 63 where wrapping of the bale is completed by a rotary film dispenser 41 as described below.

To reduce the height to which the chamber 7 needs to be lifted on the columns 11 to allow clearance of the bale 20 during the tilting movement (shown in FIG. 8) a top portion 88 of the chute 87 is pivoted to a lower part of the chute 87 by a pivot 92. A hydraulic ram 98 is connected between the chute 87 and the top portion 88. Operation of the ram 98 causes the portion 88 to tilt forwards to provide clearance for the bale, which is now transferred, by transfer means 50, to the second wrapping station 3.

The transfer means 50 is adapted to turn the partly wrapped bale 20 through approximately 90° onto a second wrapping platform where the ends of the bale 20 are wrapped in plastics film. At the first wrapping station the bale 20 stands on its end with its longitudinal axis in a vertical position. It is turned so that its longitudinal axis lies in a horizontal plane, coaxially with the longitudinal axis of the machine. A similar transfer means is utilised in the second embodiment and is illustrated e.g. in FIGS. 31 and 34 to 36.

Figure 11:
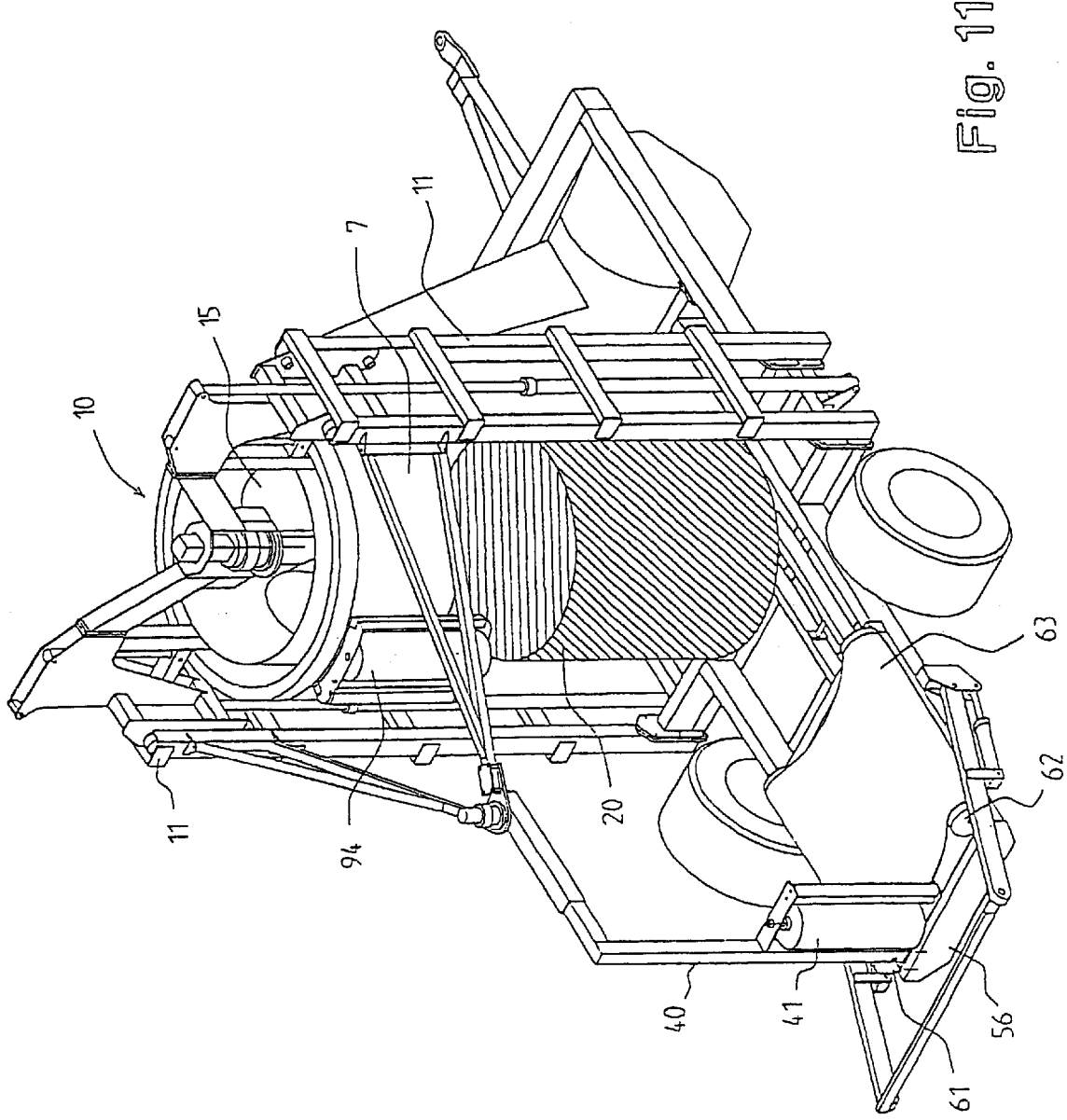
FIG. 11 is a rear perspective view of the machine of FIG. 8.

Referring to FIGS. 8, 11 and 12 the transfer means 50 comprises a normally horizontally-disposed frame 51 having an upright 52, which carries a hook 54 pivotally connected thereto. The frame 51 carries a conveyor support frame 56 which is pivotally connected thereto by brackets 58. A pair of spaced driven belt rollers 61, 62 are mounted for rotation on the support frame 56. An endless belt 63 is mounted for rotation about the belt rollers 61, 62 in well known manner. The belt 63 forms a conveyor floor on which the bale 20 may be rotated about its longitudinal axis as hereinafter described.

The frame 51 is pivotally attached to the chassis 4 at a bracket 53. A hydraulic ram 55 is pivotally attached at one end to a bracket 57 on the chassis 4 and at the other end is pivotally connected to a bracket 59 on the underside of the frame 51. Extension of the ram 55 thus acts to swing the frame 51 and the conveyor frame 56, through approximately 90°, from the position shown in FIG. 8 to the position shown in FIG. 34 where the belt 63 abuts the side of the partly wrapped bale 20.

Figure 34:
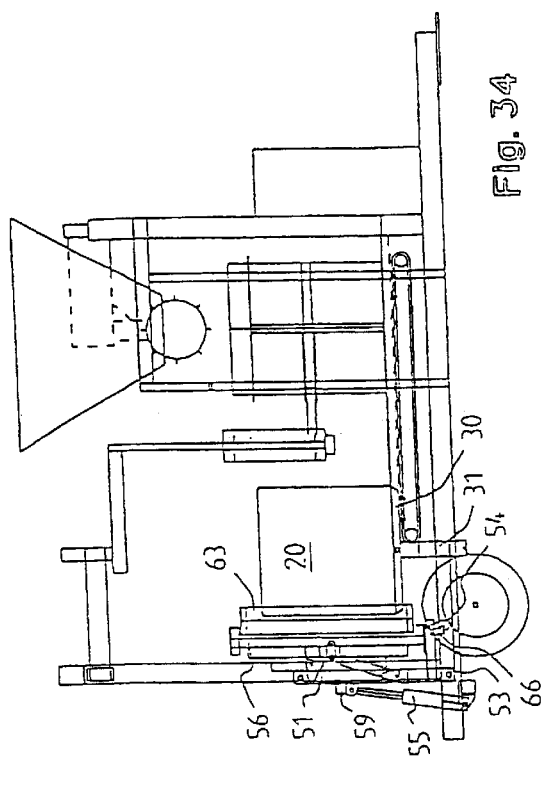

In this position the hook 54 engages with a bracket 66 on a frame 67 (see FIG. 34). The frame 67 supports the wrapping platform 30 and ram assembly 31. The frame 67 is pivotally connected to the chassis 4 at pivot 53.

Figure 35:
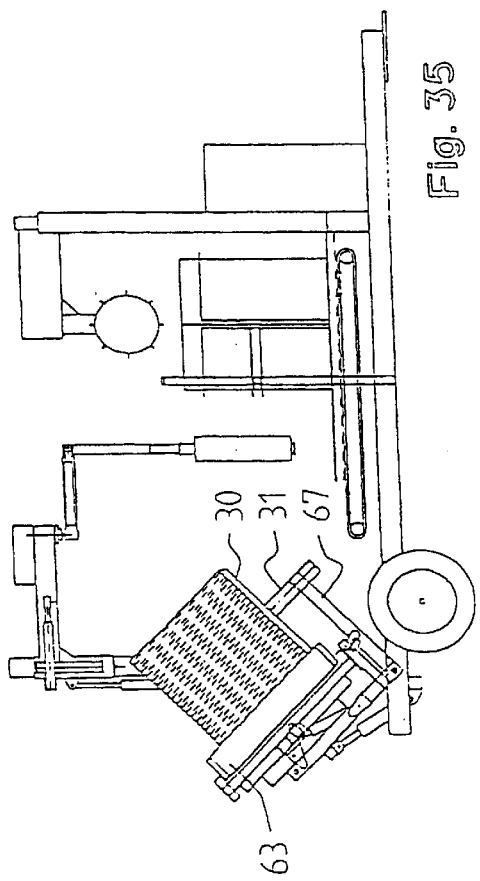

The ram 55 is then retracted to swing the frame 51, back, through 90°, to its original position. As it swings back the frame 67 together with the platform 30 and the partly-wrapped bale 20 are also swung, through 90°, as shown in FIGS. 12 and 35 to the second wrapping station 3, where the bale rests on the belt 63. In this position the ends 27 of the bale are exposed for wrapping. As shown in FIG. 36 the platform 30 and ram assembly 31 are returned to their original position under spring bias.

A modified arrangement for the bale support platform 3 at the first wrapping station is shown in FIGS. 13 and 14. During the wrapping operation the first layer of wrapping film is caused to overlap the platform 30 (see. FIG. 13) to form a sleeve around the platform. To assist in detaching the formed bale 20 from the platform 30 during the transfer to the second wrapping station the platform 30 is adjustable in diameter.

FIG. 14 shows a plan view of the platform 30 and a transfer plate 106. It consists of two overlapping parts 108 and 109. Part 108 is crescent shaped and part 109 is near circular. Part 108 is slideable under part 109. When the platform 30 is horizontal the parts 108, 109 are fully extended to form a complete circle.

When the partly-wrapped bale 20 is being transferred to the second wrapping station as described above, the support frame 67 for the platform 30 pivots, from a horizontal position, about pivot 53, to the vertical position shown in FIG. 13. A strut 110 is pin-jointed to pivot 111 at one end, at its other end it is pivotally connected to the bottom of a pivot arm 107. Arm 107 pivots, near its centre, about pivot 112 on a bracket attached to the underside of part 109. The other (top) end of pivot arm 107 is pin-jointed to one end of a short strut 113, The other end of the strut 113 is pin-jointed to the part 108.

The pivot 111 is located rearwardly of pivot 53. Thus when the plate 30 is moved through 90° as shown in FIG. 14, this causes the linkage struts/arms 110, 107 and 113 to move which, in turn, cause the part 108 to slide relative to part 109. This reduces the diameter of the wrapping platform 30 (to the size shown in broken line in FIG. 14). Thus, when the arm 67 and platform 30 are retracted from the vertical position back to the horizontal, the reduction in the overall size of platform 30 enables it to detach more easily from the portions of the wrapping film 44 which overlap the corners of the bale 20 and the platform 30.

As the platform 30 returns to its normal horizontal position the linkage described above operates in the opposite direction to extend the overlapping parts 108, 109 such that the platform 30 assumes its full size. It will be appreciated that the linkage may be replaced by hydraulic means to cause relative movement of parts 108, 109.

FIGS. 15 and 16 show the next stage in the baling and wrapping operation. The formed bale 20 is undergoing wrapping at the second wrapping station 3, while the compaction chamber 7 has been lowered to its lowermost position to begin compaction of a new bale.

The means for wrapping the bale 20 at the second wrapping station 3 comprises a wrapping dispenser 41 containing a roll of plastics film in well known manner. This is carried by a support arrangement comprising fixed struts 36 which extend rearwardly from the top of the columns 11 and support a hydraulic motor 37 which drives a rotary arm 38 in a circular path around the endless belt 63. the rotary arm 38 is telescopically extendible in a horizontal plane. At least one vertically disposed wrapping arm 40 depends downwardly from the end of the rotary arm 38. The dispenser 41 is mounted on the end of this arm. Optionally, as shown in FIG. 15 two film dispensers 41, disposed at 180° to each other; may be used. These rotate in unison around the bale 20.

The film dispenser 41 is of well known construction and may include a pretensioning unit through which the plastics film is fed and stretched. The film dispenser may include a cut and start device for severing the film at the end of wrapping, e.g. of the kind shown in IE S80403.

To commence wrapping a free end of the plastics film is attached to the bale 20. The film dispenser 41 is then caused to rotate around the bale 20 to wrap the remainder of the bale in plastics film in well known manner.

Simultaneously, the endless belt 63 is operated to turn the bale 20 about its horizontal axis in well-known manner, to achieve a complete wrapping of the bale 20 with at least two layers of plastics film.

The second wrapping station 3 may comprise wrapping apparatus of the kind described in EP 539549, for example, where the be it 63 has a substantial sag. Alternatively, the belt 63 could be replaced by an array of rollers for turning the bale.

When the bale is fully wrapped it is tipped from the endless belt 63 by a tipping mechanism as illustrated in FIG. 17. As shown in the embodiment of FIG. 39, a ram 60 causes the support frame 56 to pivot about a pivot 69 in the frame 51. As the bale 20 is tipped rearwardly it comes in contact with a pivot platform 48 (FIG. 17). This is supported and held in place by two arms 45 which are pivoted to the chassis 4. The downward movement of the arms 45 is restricted by two hydraulic accumulator rams (46). As the weight of the bale 20 comes onto the pivot platform 48 it causes the arms 45 to swing down onto the ground, as shown in broken lines in FIG. 17, against the bias of the rams. The bale 20 is thus lowered gently onto the ground. The forward movement of the machine pulls the pivot platform 48 from underneath the stationary bale 20, and the arms 45 are then raised by the rams 47 to their upper position. The inner ends of the arms 45 are pivotally connected to brackets 46, one on each side of the machine. The free outer ends of the arms 45 are pivotally connected to the respective ends of the pivot platform 48. The platform 48 is pivotally connected to the arms 45 intermediate its width so that it is freely rotatable between the arms.

The tipping device of the invention has the advantages that it enables the wrapped bale, which is heavy, to be lowered gently onto the ground. This is important because if the bale is not gently dropped the wrapping may be punctured by stalks or stones. The tipping device is designed so that it can deposit the bale on the ground either lengthways or on its end.

A second embodiment of the invention is illustrated in FIGS. 21 to 39. This embodiment also includes a compacting station 1, a first wrapping station 2 and a second wrapping station 3. However, unlike the previous embodiment the first wrapping station 2 is located rearwardly of the compaction chamber 1.

The compacting station 1 includes a vertical compactor 10 and a hopper 9 for feeding material to the compactor 10. However, in this embodiment the compaction chamber 7 is not raised vertically, as in the previous embodiment, but moves horizontally as described below.

In a typical use of this embodiment a conventional forage harvester 81, for example of the type marketed under the tradename "Tarup", or model "FCT850" as sold by J. F. Farm Machinery is used in conjunction with the machine of the invention. Grass, or other suitable forage crop, is cut in the field by a mower and left to wilt for a day or so. The forage harvester 81, which is towed by a tractor 82, picks up the cut grass (silage), precision cuts the silage into short lengths and blows the chopped silage through a feeding chute 83 into the hopper 9 of the compacting station of the invention. The precision cut silage is then baled and wrapped as hereinafter described. With this arrangement the forage harvester 81 travels in tandem with the machine of the invention.

Alternatively, as shown in FIG. 22 the machine incorporates an integral forage harvester 84 as described in the previous embodiment.

Referring now to FIGS. 23 to 26, as in the previous embodiment the compaction chamber 7 is vertically oriented, is cylindrical in shape, and has an open top 8. The hopper 9 is mounted above the open top 8 and feeds cut grain, precision chopped silage, and other material to be baled into the chamber.

In this embodiment, a single vertical support column 11 is mounted at the front of the machine. A downwardly inclined support arm 12 is mounted on the column 11 and is slideable in vertical direction along the column by means of a hydraulic ram. The support arm 12 carries, at its lower end a compaction head 15 having two rollers 13. The compaction head 15 operates as described above, in relation to the first embodiment, and like reference numerals denote like parts.

Material to be baled is directed into the compaction chamber 7 by the hopper 9 and it is compressed by the compaction head 15 as described above.

The hopper 9 retains a reasonable volume of loose fodder such that there is a constant feed to the compaction chamber 7.

When the bale 20 is fully formed the rotating compaction head 15 is lifted clear of the top of the bale, and is so designed as to simultaneously close off the outlet from the hopper 9 to prevent further feed of fodder from the hopper during the removal of the bale 20 from the compaction chamber 7.

The compaction chamber 7, containing the compacted bale 20 is now moved horizontally to the first wrapping station 2.

Figure 26:
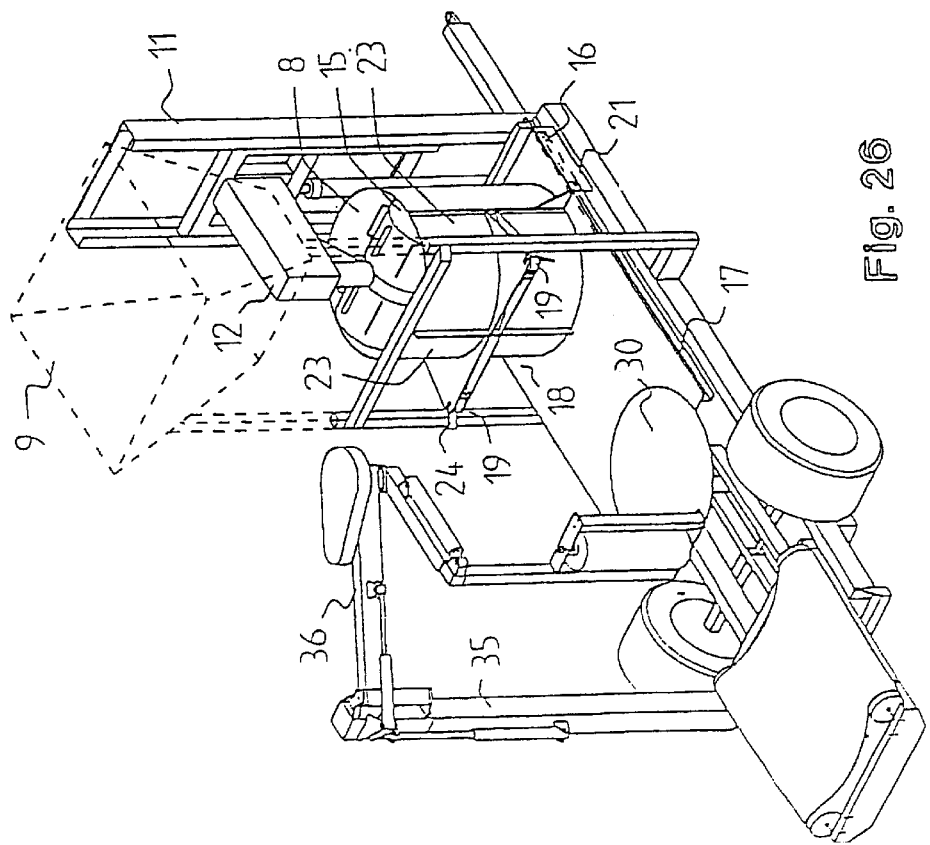
FIG. 26 is a perspective view similar to that of FIG. 23 showing the compacting of the bale.

The compaction chamber 7 is mounted on a conveyor 21 which is driven by a chain drive 22 about rollers 23 and 24 suitably mounted for rotation on the chassis 4. Wheels or rollers 16 are provided on the conveyor 21 (see FIG. 29), and these move in longitudinal channels 17, to each side of the chassis 4. The compaction chamber 7 may thus move longitudinally in a horizontal plane along the chassis 4 from the front end towards the rear end of the chassis 4, as shown in FIGS. 26 and 27, until it reaches a circular platform 30 on which the bale 20 is deposited.

Figure 27:
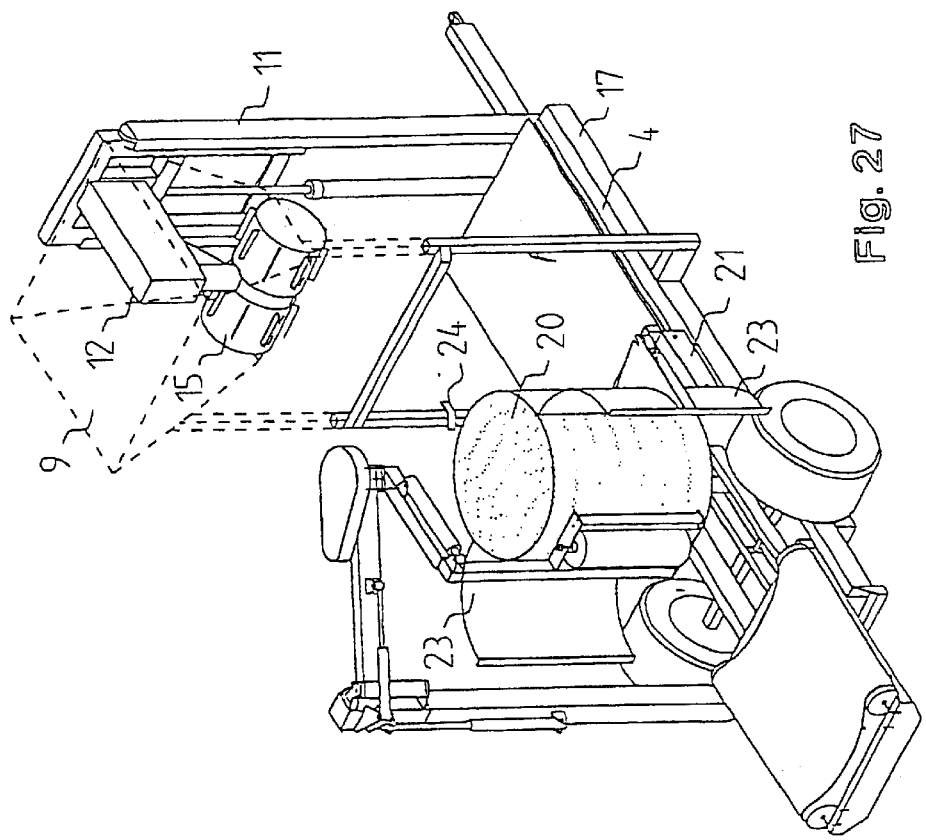
Figure 30:
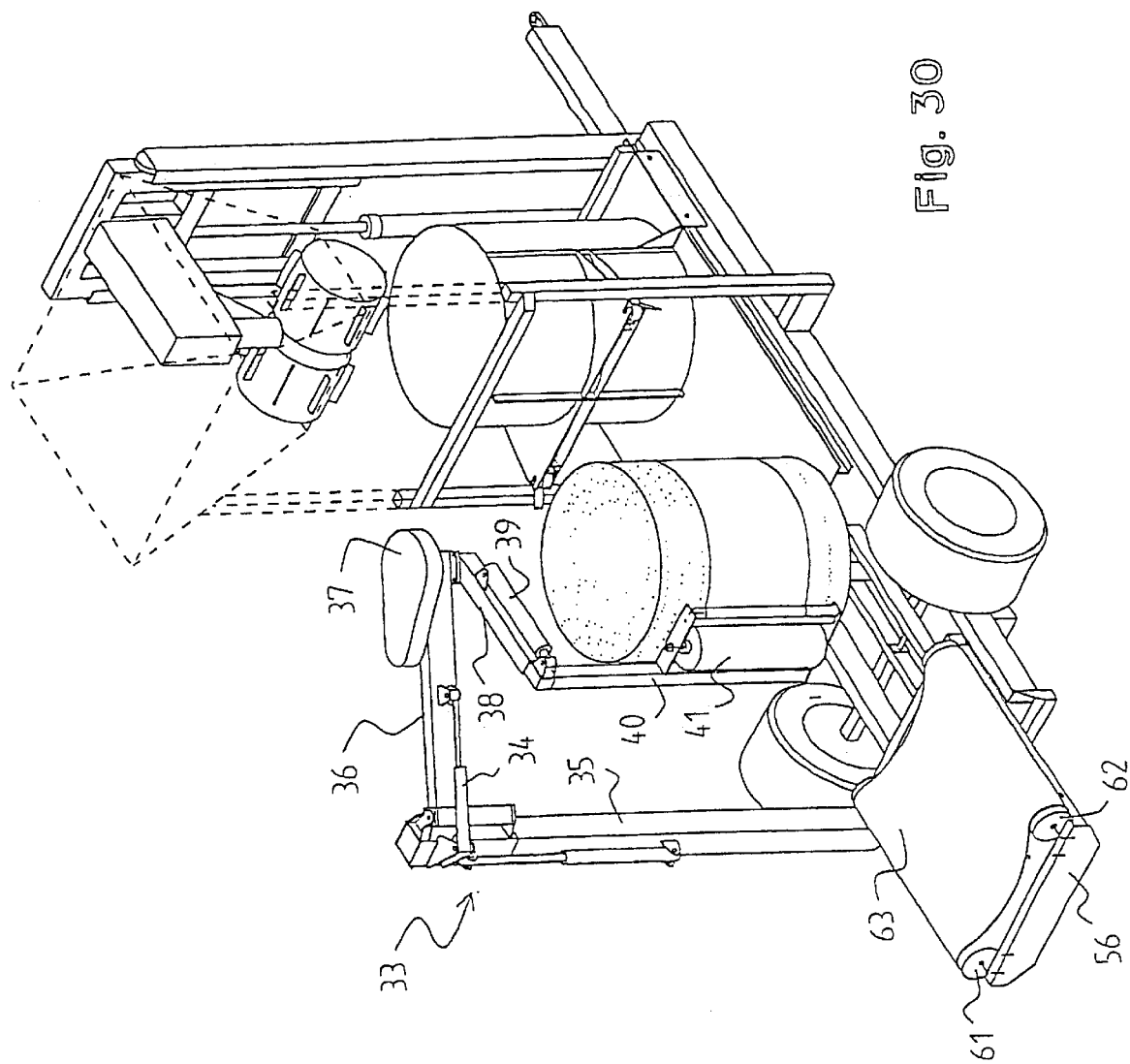
FIGS. 30 and 31 are a perspective view, and a side elevation, respectively, of the machine showing the wrapping of the bale at the first wrapping station.
Figure 29:
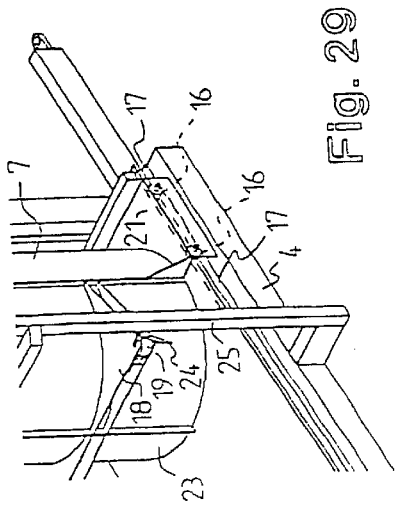
FIG. 29 shows a detail of FIG. 28.

The chamber 7 is then retracted to its original position at the compaction station 1 leaving the formed bale 20 resting on a platform 30 at the first wrapping station 1, as shown in FIGS. 27 and 30. The side wall of the compaction chamber 7 is provided with a pair of doors 23 of arcuate shape. The doors 23, open towards the first wrapping station 2. As the chamber 7 begins to retract the doors 23, which are unlocked at this stage, open fully due to the relative movement of the chamber 7 and the bale 20.

As the chamber 7 retracts the doors 23 close automatically. The doors are provided with locks 18 (see FIG. 29) which permit operation of the compactor 10 only when the doors are fully closed and locked. The locks 18 are operated by means of a cam mechanism comprising wheels 19 on the lock which engage cams 24 on uprights 25. The uprights 25 are joined at the top by a transverse bar 28 which help to strengthen the construction at this location which is subject to high pressure during compaction. The locks 18 comprise substantially triangular-shaped plates welded to the front of the doors 23. The wheels 19 are journalled for rotation at the apex of the triangles. The wheels engage the cams 24 which are each in the form of an angled ramp inwardly inclined towards the front of the machine. Thus, as the wheels engage and run along the ramps 24, the inward inclination of the ramp forces the doors to close, until the wheels 19 pass the angled part of the ramp whereupon the wheels 19 lock in position, and in turn lock the doors 23. Filling of the compaction chamber 7 can then recommence to form a second bale 20 of fodder.

At the same time wrapping of the first bale 20 commences at the first wrapping station 2.

Figure 31:
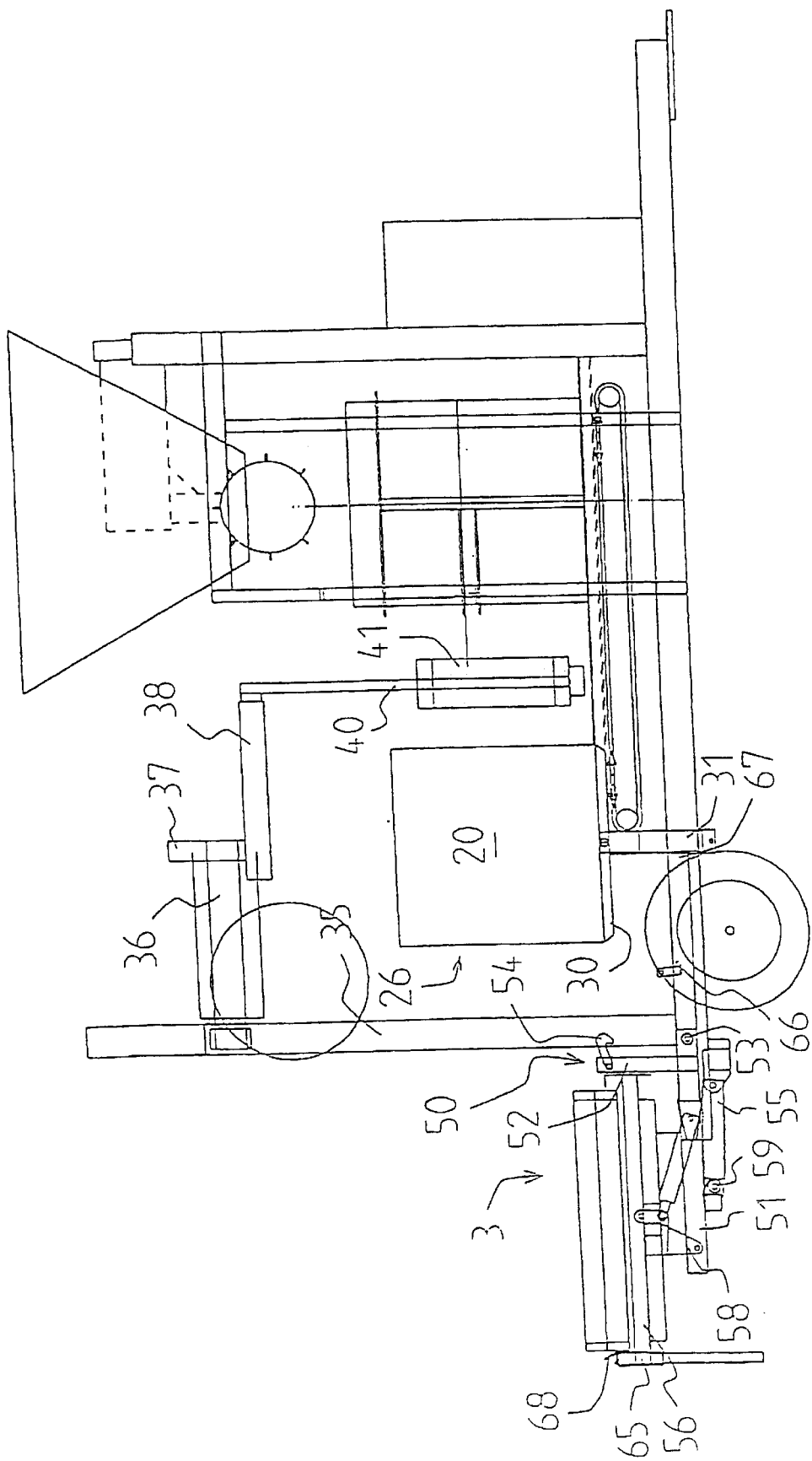

As shown in FIGS. 31 and 33 the wrapping station 2 comprises a horizontally disposed wrapping platform 30 which has bevelled edges, to facilitate the wrapping of the lower edges and corners of the bale 20. A hydraulic ram 31 is positioned below the platform 30 and is adapted to raise the platform 30 upwardly during the wrapping operation (see FIG. 33), again facilitating the wrapping of the bale. The diameter of the platform 30 is less than the diameter of the bale 20 so as to expose the edge of the bale for wrapping. For example, the diameter of the platform 30 may be 1.00 m. while the diameter of the bale is 1.04 m.

The means for wrapping the bale 20 with a plastics film comprises a vertical support member 35 positioned to one side of the machine (see FIGS. 25, 26 and 27) and approximately between the first wrapping station 1 and the second wrapping station 2. A swinging arm 36 is pivotally mounted on, and extends horizontally from, the support member 35 near the top thereof. The arm 36 is swingable, through approximately 90°, from the position shown in FIG. 31 (as outlined in full lines in FIG. 25) to the position shown in FIG. 37 (as outlined in broken lines in FIG. 25). Thus, it can be swung, by hydraulically operable means, from the first wrapping station 2 to the second wrapping station 3.

As shown more particularly in FIGS. 30 and 31, a rotatable hydraulic drive member 37 is mounted on the end of the swingable arm 36. This carries a rotary support arm 38 which is rotatable about a vertical axis defined by the drive member 37. A vertically disposed wrapping arm 40 depends downwardly from the end of the rotary support arm 38. The wrapping arm 40 has a dispenser 41 of plastics film rotatably mounted on the lower end thereof. The hydraulic drive member 37 can thus cause the film dispenser 41 to rotate around the bale 20 along the circular path indicated by the line 42 in FIG. 6.

The film dispenser 41 is of well known construction and may include a pretensioning unit through which the plastics film is fed and stretched. The film dispenser may include a cut and start device for severing the film at the end of wrapping.

To commence wrapping a free end of the plastics film is attached to the bale 20. The film dispenser 41 is then caused to rotate around the bale 20 to wrap the remainder of the bale in plastics film in well known manner.

However, unlike conventional bale wrapping machines the machine of the invention is adapted to wrap only the outer circumference 26 of the bale at the first wrapping station 2. However, the design, and raising, of the wrapping platform 30 permits the film to cover the lower corners of the bale. The wrapping of the bale is further illustrated in FIGS. 32 and 33. FIG. 33 shows the platform 30 in a raised position during the wrapping of the lower part of the bale 20, whereas FIG. 32 shows the upper part of the bale being wrapped, with the platform 30 in the lowered position.

The film dispenser 41, together with the arm 36, 37 are automatically raised vertically along the vertical support member 35 by means of a vertically disposed ram 32, which is attached at a lower end to the member 35 and at the other end to a slideable hinge arrangement 33 for the arm 36 (see FIG. 30). A horizontally disposed ram 34 effects the swinging movement of the swinging arm 36.

The arm 38 is telescopic and is horizontally extendible by means of a hydraulic ram 39. The length of the arm 38 is shortest when it is operable in the first wrapping station. When it is operating in the second wrapping station it is lengthened, as shown in FIG. 37. The hydraulic rams 34 and 39 are operably looped through a rotary coupling and operate simultaneously such that when the arm 38 is positioned above the first wrapping station the ram 39 and the arm 38 are fully retracted, and are filly extended when over the second wrapping station.

Preferably, wrapping commences at the upper part of the bale, as shown in FIG. 32 because it is important to quickly secure the top of the bale which tends to be the loosest part and most liable to falling apart. The dispenser 41 moves vertically downwards as wrapping progresses. Simultaneously, the ram 31 is raised to raise the platform 30 to expose the lower corner of the bale so that the plastics film can wrap over the corner. Suitably, two layers of plastics film are wrapped on the bale at the first wrapping station.

It will be noted that the bale 20 has been formed without the use of twine or cord to keep it from falling apart. Because the transfer of the bale 20 from the compacting station to the first wrapping station is effected by means of the movement of the compaction chamber 7 the integrity of the bale is maintained. The first wrapping of the bale at the first wrapping station suffices to hold the bale together. However, if rotation of the bale were to be effected to achieve wrapping, as in a conventional wrapping machine, it is likely that the bale would fall apart at this stage.

Thus, no rotation of the bale takes place at the first wrapping station. Instead, after wrapping of the circumference of the bale at the first wrapping station 2, the bale is transferred, by transfer means 50, to the second wrapping station 3.

The transfer means 50 turns the partly wrapped bale 20 through approximately 90° onto a second wrapping platform where the ends of the bale 20 are wrapped in plastics film. At the first wrapping station the bale stands on its end with its longitudinal axis in a vertical position. It is turned so that its longitudinal axis lies in a horizontal plane, coaxially with the longitudinal axis of the machine, on the endless belt 63. The transfer means 50 is the same as that described above in relation to the first embodiment and it operates in the same way. Like referenced numerals in the drawings denote like parts.

As the bale 20 is transferred onto the endless belt 63, simultaneously the swinging arm 36 of the wrapping means is swung over to the second wrapping station 3 as shown in FIG. 37 (illustrated by broken line in FIG. 25). The wrapping dispenser 41 is then operated, as before, to wrap the ends 27 of the bale 20 with plastics film. The film dispenser 41 is caused to rotate around the bale 20 along the path 43 indicated by broken lines in FIG. 25. Simultaneously, the endless belt 63 is driven to rotate the bale 20 about its longitudinal axis to effect a full wrapping of the bale with at least two layers of film, in well known manner.

When the bale 20 is fully wrapped it is tipped form the machine as shown in FIG. 39. This is achieved by means of a ram 60 which causes the support frame 56 to pivot about a pivot 69 on the frame 51. A tipping arm 68 is optionally provided on the end of the support frame 56. The arm 68 is slideable in a socket 65. As the frame 56 tilts the arm 68 is caused to extend, by means of either a mechanical linkage or hydraulic ram, to partly support the bale during tilting.

Modifications of the machine described above are shown in FIGS. 40 to 41, where like reference numerals denote like parts.

FIG. 40 illustrates a modification of the operation of the transfer means 50 for transferring the partly-wrapped bale from the first wrapping station 2 to the second wrapping station 3. In the case of some loose materials undergoing compaction and wrapping there is a danger that a small amount of material may spill or be lost from the top of the bale as it is turned through 90° onto the belt 63. To avoid this problem the transfer operation is interrupted by control means, after the bale has been turned through about 75° (i.e. at a position where the bale is at approximately 15° to the horizontal). While the bale 20 is in this position the rotary support arm 38 is rotated, as shown by an arrow in FIG. 40, to wrap at least one layer of the wrapping material around the uncovered end of the bale 20. The transfer of the bale 20 then continues until it lies horizontally on the belt 63.

FIGS. 41 and 42 illustrate a modification of the first wrapping station. In the embodiment described above in relation to FIGS. 31 and 33, the wrapping platform 30 may be raised by ram 31 to facilitate the wrapping of the lower corner of the bale 20.

In the modified version shown in FIGS. 41 and 42, the platform 30 is fixed. Instead, the floor adjacent the first wrapping station is provided with a flap 89 which extends transversely of the floor and is hinged thereto. The flap 89 is moved by a hydraulic ram 90 and moves from a horizontal position, where it forms a part of the floor (see FIG. 42), through approximately 90°, to a downwardly hinged position (see FIG. 41) to provide a space between the floor and platform 30 into which the film dispenser 41 on wrapping arm 40, may be lowered to wrap the wrapping material around the bottom corner of the bale as shown in FIG. 41.

The machine of the invention may be used either as a stationary machine to which the fodder is transported for compacting, baling and wrapping. Alternatively, it may be mobile so as to move around the field picking up the cut grass or other fodder, baling and wrapping it as it moves. Thus, the machine of the invention may have a pick up and chopper system fitted to it or it may be fed by a tractor drawn silage harvester working alongside. Alternatively in the stationary position the grass may be picked up and chopped in the field with a tractor drawn silage harvester and brought to the parked machine in a bulk silage station. The machine would then require either a tractor and loader or have its own self loading arm fitted to load the loose silage and to lift off and stack the wrapped bales.

In the embodiments shown, the second wrapping station is located at the end of the chassis 4. It will be appreciated that, alternatively, it could be located to the side of the machine.

Other modifications may be made to the machines described above. For example, he integral forage harvester may be wider than that shown in the drawings to increase output. Also, where the forage harvester is integral with the machine of the invention, it may be detachably secured to the front of the machine in well known manner. Thus, the forage harvester could be unhooked from the machine of the invention for use for other purposes. Also the machine of the invention may include a trailer connected to the rear of the machine so that the fully wrapped bales may be tipped directly onto the trailer instead of onto the ground.

In the above description, the compacting chamber is of cylindrical shape to produce cylindrical bales 20. However, it will be appreciated that different shaped compacting chambers may be used, e.g. rectangular or square shaped. In that case, the second wrapping station may be adapted to wrap square bales e.g. by incorporating the invention of EP 539549 and IE S970777

The machine and method of the invention has a number of advantages over existing bale wrapping system, for example:

(1) The new machine and method handles much shorter grass than conventional machines, this is a big advantage when the silage is incorporated into a diet using a diet mixer machine. The shorter material makes a much more homogenous mix.

(2) The system of the invention will handle maize silage. At present maize silage can only be made in a pit as conventional balers and wrappers cannot handle it. Indeed the invention enables the baling of all fine particulate material, e.g. precision chopped material of a particle size or length or from 15 to 50 mm. Previously, it has been difficult to bale such materials.

(3) No twine is required on the bales and so they are much easier to feed. It is very time consuming with the conventional system to cut the twine off bales before feeding.

(4) The baler system of the invention produces very high density bales, for example up to twice the density of existing soft centered bales. This reduces the cost of plastic per unit weight of silage by as much as 50%. This makes bale wrapping far more cost effective so that it can compete on cost with pit silage. It is also more environmentally friendly because there is less used plastic to dispose of.

(5) The invention requires less plastics per bale because of the improved wrapping technique. With prior bale wrappers the ends of the bale have far more layers of film than the circumference of the bale. With the technique of the invention the circumference of the bale is wrapped first then the ends so in this way the unnecessary extra layers of plastic on the ends of the bales are reduced.

(6) The baling system of the invention, with its rotating cleated rotors, presses the grass much more than existing balers. This pressing or conditioning helps to hold the sugars in grass, thus maintaining its feeding value during storage.

(7) It is possible to make different length bales on the machine of the invention with very little adjustment. In this way a contractor can make bales to suit the requirement of the individual farmer. Most conventional balers have fixed chamber so they can only make on size of bale.

(8) A particularly important advantage of the machine and method of the invention is that they permit the transfer of the compacted bale from the compactor to the second wrapping station without the need for secondary containment means such as cord, twine, netting or the like. The preliminary wrapping of the bale at the first wrapping station, including the overlapping of the corners, enables the bale to be transferred without breaking up.

A further embodiment of the invention is illustrated in FIGS. 43 to 47, this is particularly suitable for wrapping bales of bricks, blocks and other discrete items in a plastics wrapping. It may also be used to wrap cartons.

In this embodiment, the wrapping machine is mounted on a stationary platform 140 rather than a wheeled chassis. It comprises a wrapping platform 130 which is located at a first wrapping station 2 and a second wrapping platform 121 located at a second wrapping station 3.

Transfer means (not shown) are provided for pivoting the platforms 130 and 121, through approximately 90²0 , to swing a partly-wrapped bale from platform 130 onto platform 121. The transfer means is constructed and operates as described above in relation to the first and second embodiments, e.g. as shown in FIGS. 31 and 34 to 37.

Means for wrapping the bale 20 with plastics film comprises a vertical support column 35 which carries a film dispenser 41 which may be swung from the first wrapping station 2 to the second wrapping station 3. The wrapping means is constructed and operates as described above in relation to FIGS. 25, 26, 27 and like reference numerals are used to denote like parts.

In use an unwrapped bale 20 of bricks is placed on wrapping platform 130 as shown in FIG. 43, e.g. by means of a grab. The wrapping means is operated to wrap the side walls and corners of the bale with plastics film as previously described. The partially wrapped bale is then transferred, through 90²0 , by the transfer means 50 to the second wrapping platform 121 as shown in FIG. 44. This exposes the bottom and top walls of the bale 20 which are then wrapped as shown in FIG. 45.

Figure 47:
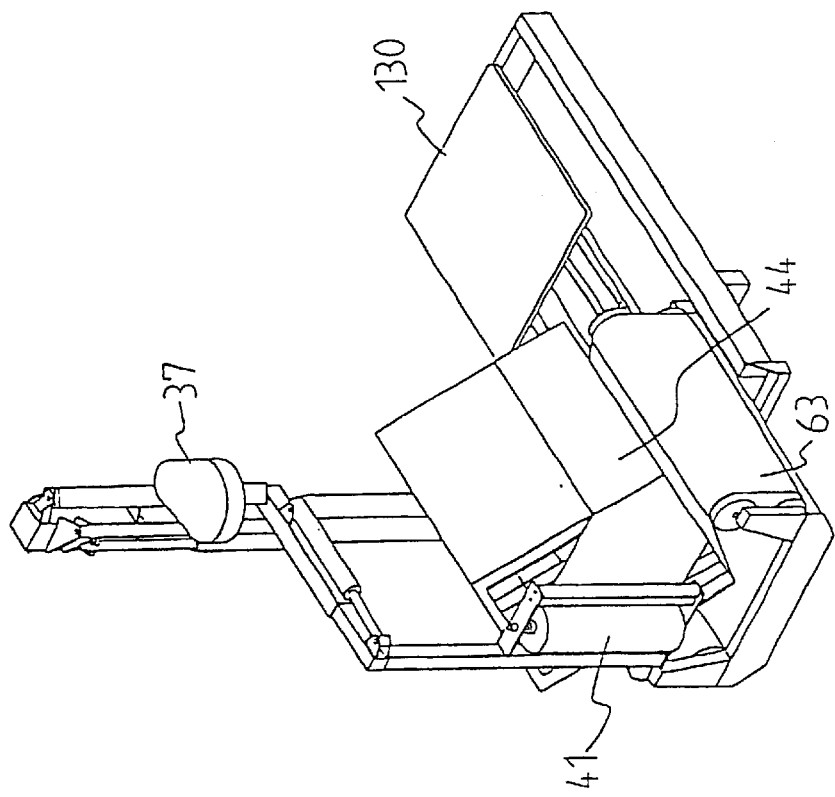
FIGS. 46 and 47 are perspective views of yet a further embodiment showing the wrapping of a bale of bricks.
Figure 46:
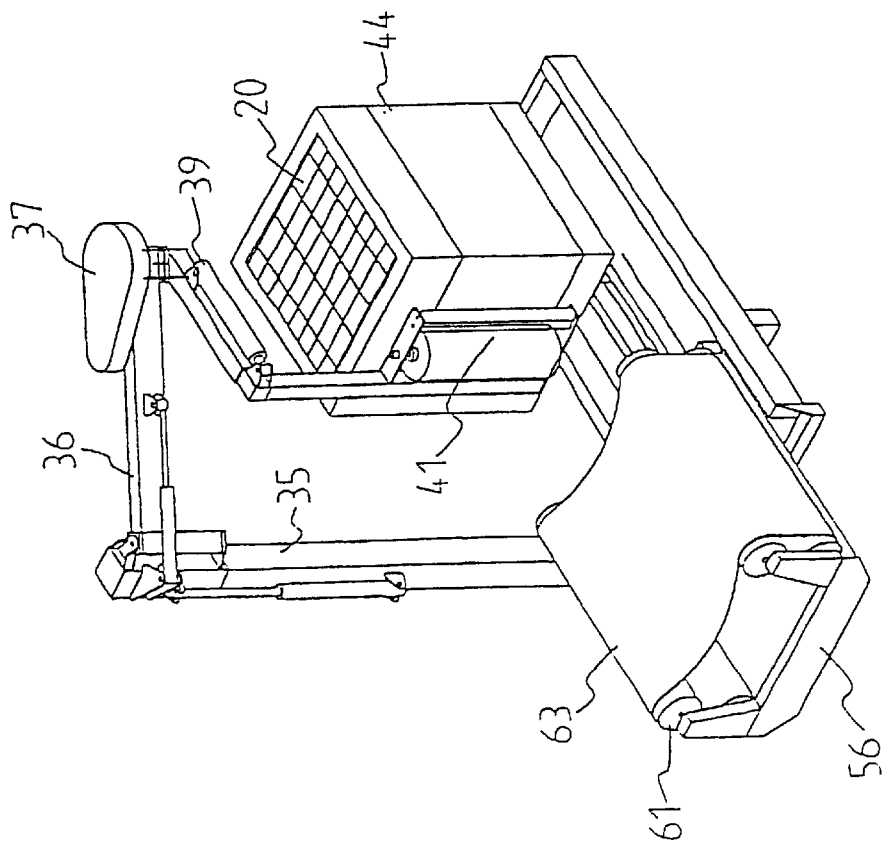

In an alternative embodiment as shown in FIGS. 46 and 47, the second wrapping platform 121 is replaced by an endless belt 63 which rotates about rollers 61 and 62 . This turns the bale about its axis during the wrapping process as described above in relation to the previous embodiments. It is constructed and operates as previously described and like reference numerals denote like parts.

From the foregoing, it will be apparent that numerous modifications and variations can be effected without departing from the true spirit and scope of the novel concept of the present invention. It will be appreciated that the present disclosure is intended to set forth exemplifications of the invention which are not intended to limit the invention to the specific embodiments illustrated. The disclosure is intended to cover by the appended claims all such modifications as fall within the scope of the claims.

Where technical features mentioned in any claim are followed by reference signs, these reference signs have been included for the sole purpose of increasing the intelligibility of the claims and accordingly, such reference signs do not have any limiting effect on the scope of each element identified by way of example by such reference signs.

What is claimed is:

1. A method for wrapping materials with a strip of wrapping material comprising the steps of:

a) moving the materials onto a wrapping platform at a first wrapping station;

b) rotating the wrapping platform to rotate the materials relative to dispensing means for wrapping material and/or rotating the dispensing means around the materials on the wrapping platform to partially wrap the materials including extending the wrapping material over the bottom and top corners of the materials;

c) pivoting a wrapping platform at the second wrapping station from a substantially horizontal position to a substantially vertical position and abuting the wrapping platform of the second wrapping station and a side of the partly wrapped bale of materials;

returning the wrapping platform of the second wrapping station back from the substantially vertical position to the substantially horizontal, and simultaneously turning the wrapping platform of the first wrapping station from the horizontal position towards a substantial vertical position such that the partly-wrapped bale of materials is transferred from the wrapping platform of the first wrapping station onto the wrapping platform at the second wrapping station; and rotating the bale of materials about a substantially horizontal axis on the wrapping platform at the second wrapping station and simultaneously effecting a relative rotational movement, about a substantially vertical axis, between the bale of materials and at least one film dispenser to completely wrap the materials in wrapping material.

2. A method of wrapping a bale of materials comprising:

moving the materials onto a wrapping platform at a first wrapping station;

carrying out a preliminary wrapping of the bale of materials by rotating the wrapping platform to rotate the bale of materials relative to dispensing means for plastics wrapping film and/or rotating the dispensing means around the bale of materials on the wrapping platform to partially wrap the bale of materials in the film including extending the wrapping film over the bottom and top corners of the bale of materials, said preliminary wrapping permitting a transfer of the partially-wrapped material to a second wrapping station without the need for containment means other than the plastics film;

transferring the partially-wrapped bale of materials to a second wrapping station;

rotating dispensing means for plastics film around the partially-wrapped bale of materials at the second wrapping station and/or rotating the partially-wrapped bale of materials relative to the plastics film dispensing to further wrap the bale of materials in plastics film;

wherein at the second wrapping station the partially-wrapped bale of materials is rotated about a substantially horizontal axis on a wrapping platform and simultaneously a relative rotational movement is effected, about a substantially vertical axis, between the partially-wrapped materials and at least one film dispenser to completely wrap the bale of materials in the plastics wrapping film.

3. A method of wrapping a bale of materials comprising:

moving the materials onto a wrapping platform at a first wrapping station; carrying out a preliminary wrapping of the bale of materials by rotating the wrapping platform to rotate the bale of materials relative to dispensing means for plastics wrapping film and/or rotating the dispensing means around the bale of materials on the wrapping platform to partially wrap the bale of materials in the film including extending the wrapping film over the bottom and top corners of the bale of materials, said preliminary wrapping permitting a transfer of the partially-wrapped material to a second wrapping station without the need for containment means other than the plastics film;

transferring the partially-wrapped bale of materials to a second wrapping station;

rotating dispensing means for plastics film around the partially-wrapped bale of materials at the second wrapping station and/or rotating the partially-wrapped bale of materials relative to the plastics film dispensing to further wrap the bale of materials in plastics film;

wherein the preliminary wrapping of the bale at said first wrapping station is effected by means of a relative rotational movement about a substantially vertical axis between the bale and said dispensing means.

4. A method of wrapping a bale of materials comprising:

moving the materials onto a wrapping platform at a first wrapping station;

carrying out a preliminary wrapping of the bale of materials by rotating the wrapping platform to rotate the bale of materials relative to dispensing means for plastics wrapping film and/or rotating the dispensing means around the bale of materials on the wrapping platform to partially wrap the bale of materials in the film including extending the wrapping film over the bottom and top corners of the bale of materials, said preliminary wrapping permitting a transfer of the partially-wrapped material to a second wrapping station without the need for containment means other than the plastics film;

transferring the partially-wrapped bale of materials to a second wrapping station;

rotating dispensing means for plastics film around the partially-wrapped bale of materials at the second wrapping station and/or rotating the partially-wrapped bale of materials relative to the plastics film dispensing to further wrap the bale of materials in plastics film;

wherein the transfer of the partially-wrapped bale of materials from the first wrapping station to the second wrapping station is effected by swinging the partially-wrapped bale through substantially 90° to the second wrapping station.

5. A method of wrapping a bale of materials comprising:

moving the bale of materials onto a wrapping platform at a first wrapping station;

carrying out a preliminary wrapping of the bale of materials by effecting a relative rotational movement about a substantially vertical axis between the bale of materials and dispensing means for plastics wrapping film to partially wrap the bale of materials in the film including extending the wrapping film over the bottom and top corners of the bale of materials, said preliminary wrapping permitting a transfer of the partially-wrapped materials to a second wrapping station without the need for containment means other than the plastics film;

transferring the partially-wrapped bale of materials to a second wrapping station; and at the second station rotating the partially-wrapped bale of materials about a substantially horizontal axis on a wrapping platform, and simultaneously effecting a relative rotational movement about a substantially vertical axis, between the partially-wrapped materials and at least one film dispenser to further wrap the bale of materials in plastics film.

6. A method as claimed in claim 5, wherein the plastics film is a pretensioned stretched plastics film.

7. A method as claim in claim 5, wherein the transfer of the partially-wrapped bale of materials from the first wrapping station to the second wrapping station is effected by swinging the partially-wrapped bale through substantially 9° to the second wrapping station.

* * * * *